US012705272B1

(12) United States Patent
Kota et al.

(10) Patent No.: US 12,705,272 B1
(45) Date of Patent: Aug. 11, 2026

(54) ENTIRE DOCUMENT SUMMARIZATION

(71) Applicant: DocuSign, Inc., San Francisco, CA (US)

(72) Inventors: Ramachandra Kota, San Francisco, CA (US); Souleiman Hasan, Dublin (IE); Yan He, San Francisco, CA (US); Seán Mahon, Dublin (IE); Alexey Zakhvatov, San Francisco, CA (US); Yan Pui Lam, San Francisco, CA (US); Navin Albert, San Francisco, CA (US)

(73) Assignee: Docusign, Inc., San Francisco, CA (US)

( * ) Notice: Subject to any disclaimer, the term of this patent is extended or adjusted under 35 U.S.C. 154(b) by 134 days.

(21) Appl. No.: 18/232,447

(22) Filed: Aug. 10, 2023

Related U.S. Application Data

(60) Provisional application No. 63/529,858, filed on Jul. 31, 2023.

(51) Int. Cl.
*G06F 16/34* (2019.01)
*G06V 10/82* (2022.01)
(Continued)

(52) U.S. Cl.
CPC ............ *G06F 16/345* (2019.01); *G06V 10/82* (2022.01); *G06V 30/274* (2022.01); *G06V 30/413* (2022.01); *G06V 30/414* (2022.01)

(58) Field of Classification Search
CPC .......... G06F 16/34; G06F 17/00; G06F 16/33; G06F 16/93; G06F 40/20; G06F 15/00;
(Continued)

(56) References Cited

U.S. PATENT DOCUMENTS 11,294,974 B1 4/2022 Shukla
11,567,975 B1 * 1/2023 Day, Jr. ............ G06F 16/24547
(Continued)

OTHER PUBLICATIONS

International Search Report for International Application No. PCT/US2024/039985, filing date Jul. 29, 2024, 15 pages.
(Continued)

*Primary Examiner* — Rayeez R Chowdhury
(74) *Attorney, Agent, or Firm* — KDW FIRM PLLC

(57) ABSTRACT

A method, a system, and a computer program product for summarizing an electronic document. A structural representation of the document is generated and/or received. The structural representation specifies one or more elements of the document and one or more relationships between one or more elements of the document. A machine learning model is identified for the document. The model is applied, based on the structural representation, to one or more portions of the document to generate a hierarchical representation for the portions. A request to execute at least one processing task related to the document is received. At least one generated hierarchical representation of at least one portion of the document is sent to a generative artificial intelligence model to execute the processing task by generating a response to the request. The response is and presented on a graphical user interface of a user computing device.

20 Claims, 20 Drawing Sheets

(51) Int. Cl.
*G06V 30/262* (2022.01)
*G06V 30/413* (2022.01)
*G06V 30/414* (2022.01)

(58) Field of Classification Search
CPC .... G06F 16/182; G06F 16/2457; G06F 16/28; G06F 16/31; G06F 16/332; G06F 16/338; G06F 16/35; G06F 16/38; G06F 16/951; G06F 18/2321; G06F 21/60; G06F 3/16; G06F 40/166; G06F 40/205; G06F 40/211; G06F 40/232; G06F 40/279; G06F 40/289; G06F 40/58
See application file for complete search history.

(56) References Cited

U.S. PATENT DOCUMENTS

| | | | | |
|---|---|---|---|---|
| 11,861,143 | B1 * | 1/2024 | Vandivere | G06F 16/93 |
| 11,875,240 | B1 | 1/2024 | Bosnjakovic | |
| 11,947,902 | B1 | 4/2024 | Grimshaw | |
| 11,947,915 | B1 | 4/2024 | Shen | |
| 11,954,102 | B1 | 4/2024 | Palaniappan | |
| 11,962,546 | B1 | 4/2024 | Hattangady | |
| 11,983,209 | B1 | 5/2024 | Matei | |
| 12,578,978 | B1 | 3/2026 | Gandhi | |
| 2018/0329990 | A1 | 11/2018 | Severn | |
| 2019/0163817 | A1 | 5/2019 | Milenova | |
| 2019/0303835 | A1 | 10/2019 | Saha | |
| 2019/0311021 | A1 | 10/2019 | Hayslett | |
| 2020/0019769 | A1 * | 1/2020 | Leibovitz | G06F 18/214 |
| 2020/0133967 | A1 | 4/2020 | Shukla | |
| 2020/0184012 | A1 | 6/2020 | Stoyanovsky | |
| 2020/0184016 | A1 | 6/2020 | Roller | |
| 2020/0250383 | A1 | 8/2020 | Cheng | |
| 2020/0320249 | A1 | 10/2020 | Hwang | |
| 2020/0387531 | A1 | 12/2020 | Agnihotram | |
| 2020/0410157 | A1 | 12/2020 | Van De Kerkhof | |
| 2021/0182996 | A1 * | 6/2021 | Cella | G06Q 10/0631 |
| 2021/0294829 | A1 | 9/2021 | Bender | |
| 2021/0319179 | A1 | 10/2021 | Muffat | |
| 2021/0382881 | A1 | 12/2021 | Ishikawa | |
| 2022/0215186 | A1 * | 7/2022 | Unni | G06F 40/58 |
| 2022/0237230 | A1 | 7/2022 | Zovic | |
| 2022/0237373 | A1 * | 7/2022 | Singh Bawa | G06N 20/00 |
| 2023/0027310 | A1 * | 1/2023 | Muralidharan | G06F 40/166 |
| 2023/0252224 | A1 | 8/2023 | Tran | |
| 2023/0308474 | A1 | 9/2023 | Thompson | |
| 2023/0326222 | A1 | 10/2023 | Hron | |
| 2023/0367969 | A1 | 11/2023 | Chaturvedi | |
| 2024/0020538 | A1 | 1/2024 | Socher | |
| 2024/0028631 | A1 | 1/2024 | Gong | |
| 2024/0086433 | A1 | 3/2024 | Carlson | |
| 2024/0104131 | A1 | 3/2024 | Tambi | |
| 2024/0126981 | A1 | 4/2024 | Shahinian | |
| 2024/0169088 | A1 | 5/2024 | Neelappa | |
| 2024/0169331 | A1 | 5/2024 | Kolchin | |
| 2024/0176321 | A1 | 5/2024 | Shapiro | |
| 2024/0289356 | A1 | 8/2024 | Fox | |
| 2024/0289366 | A1 | 8/2024 | Hranj | |
| 2024/0303516 | A1 | 9/2024 | Bergonzo | |
| 2024/0346086 | A1 | 10/2024 | Jha | |
| 2024/0362286 | A1 | 10/2024 | He | |
| 2024/0370479 | A1 | 11/2024 | Hudetz | |
| 2024/0411527 | A1 * | 12/2024 | Groenewegen | G06N 20/00 |

OTHER PUBLICATIONS

International Search Report and Written Opinion for International Application No. PCT/US2024/024882, dated Jun. 28, 2024, 16 pages.

* cited by examiner

DOCUMENT SUMMARIZATION ENGINE 124

DOCUMENT STRUCTURE GENERATION ENGINE 204

DOCUMENT PORTION(S) PROCESSING ENGINE 206

ML SELECTION MODEL(S) 212

TASK PROCESSING ENGINE 208

SUMMARY GENERATOR 210

OUTPUT 216

TASK 222

FEEDBACK 218

USER DEVICE 214

GENERATIVE AI MODEL(S) 220

ELECTRONIC DOCUMENTS 202

1400

GENERATE A STRUCTURAL REPRESENTATION OF AN ELECTRONIC DOCUMENT, THE STRUCTURAL REPRESENTATION SPECIFYING ONE OR MORE ELEMENTS OF THE ELECTRONIC DOCUMENT AND ONE OR MORE RELATIONSHIPS BETWEEN THE ONE OR MORE ELEMENTS OF THE ELECTRONIC DOCUMENT 1402

IDENTIFY A MACHINE LEARNING MODEL FOR THE ELECTRONIC DOCUMENT, AND APPLYING, BASED ON THE STRUCTURAL REPRESENTATION OF THE ELECTRONIC DOCUMENT, THE MACHINE LEARNING MODEL TO ONE OR MORE PORTIONS OF THE ELECTRONIC DOCUMENT TO GENERATE A HIERARCHICAL REPRESENTATION FOR THE ONE OR MORE PORTIONS OF THE ELECTRONIC DOCUMENT 1404

RECEIVE A REQUEST TO EXECUTE AT LEAST ONE PROCESSING TASK RELATED TO THE ELECTRONIC DOCUMENT 1406

SEND AT LEAST ONE GENERATED HIERARCHICAL REPRESENTATION OF AT LEAST ONE PORTION IN THE ONE OR MORE PORTIONS OF THE ELECTRONIC DOCUMENT TO A GENERATIVE ARTIFICIAL INTELLIGENCE (AI) MODEL TO EXECUTE THE AT LEAST ONE PROCESSING TASK BY GENERATING A RESPONSE TO THE REQUEST 1408

RECEIVE THE RESPONSE AND PRESENT THE RESPONSE ON A GRAPHICAL USER INTERFACE OF AT LEAST ONE USER COMPUTING DEVICE 1410

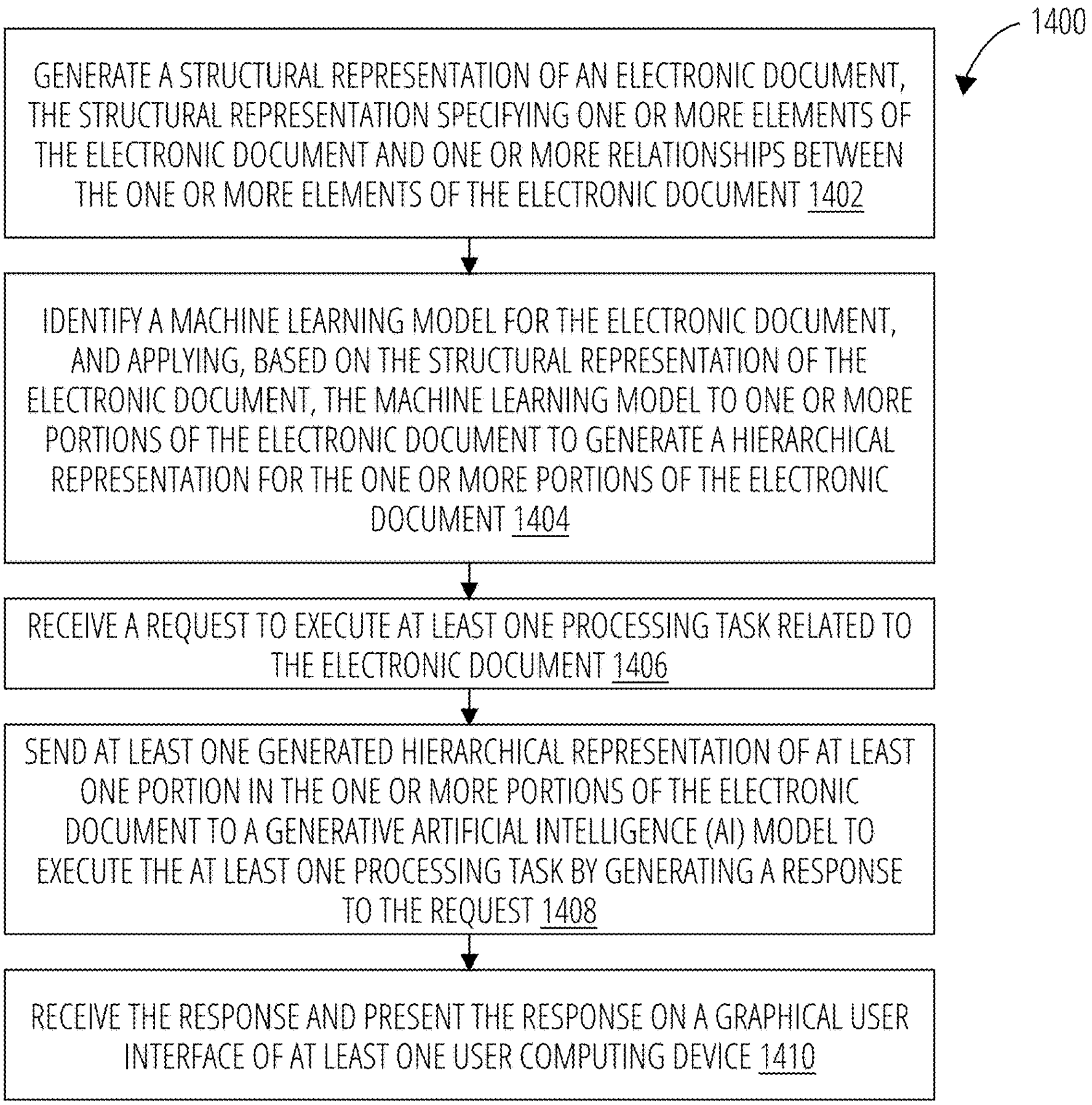

FIG. 14

IDENTIFY A MACHINE LEARNING MODEL FOR AN ELECTRONIC DOCUMENT, AND APPLYING, BASED ON A STRUCTURAL REPRESENTATION OF THE ELECTRONIC DOCUMENT, THE MACHINE LEARNING MODEL TO ONE OR MORE PORTIONS OF THE ELECTRONIC DOCUMENT TO GENERATE A HIERARCHICAL REPRESENTATION FOR THE ONE OR MORE PORTIONS OF THE ELECTRONIC DOCUMENT, WHERE THE STRUCTURAL REPRESENTATION OF THE ELECTRONIC DOCUMENT SPECIFIES ONE OR MORE ELEMENTS OF THE ELECTRONIC DOCUMENT AND ONE OR MORE RELATIONSHIPS BETWEEN THE ONE OR MORE ELEMENTS OF THE ELECTRONIC DOCUMENT 1602

SEND, IN RESPONSE TO RECEIVING A REQUEST TO EXECUTE AT LEAST ONE PROCESSING TASK RELATED TO THE ELECTRONIC DOCUMENT, AT LEAST ONE GENERATED HIERARCHICAL REPRESENTATION OF AT LEAST ONE PORTION IN THE ONE OR MORE PORTIONS OF THE ELECTRONIC DOCUMENT TO A GENERATIVE ARTIFICIAL INTELLIGENCE (AI) MODEL TO EXECUTE THE AT LEAST ONE PROCESSING TASK BY GENERATING A RESPONSE TO THE REQUEST 1604

PRESENT THE RESPONSE ON A GRAPHICAL USER INTERFACE OF AT LEAST ONE USER COMPUTING DEVICE 1606

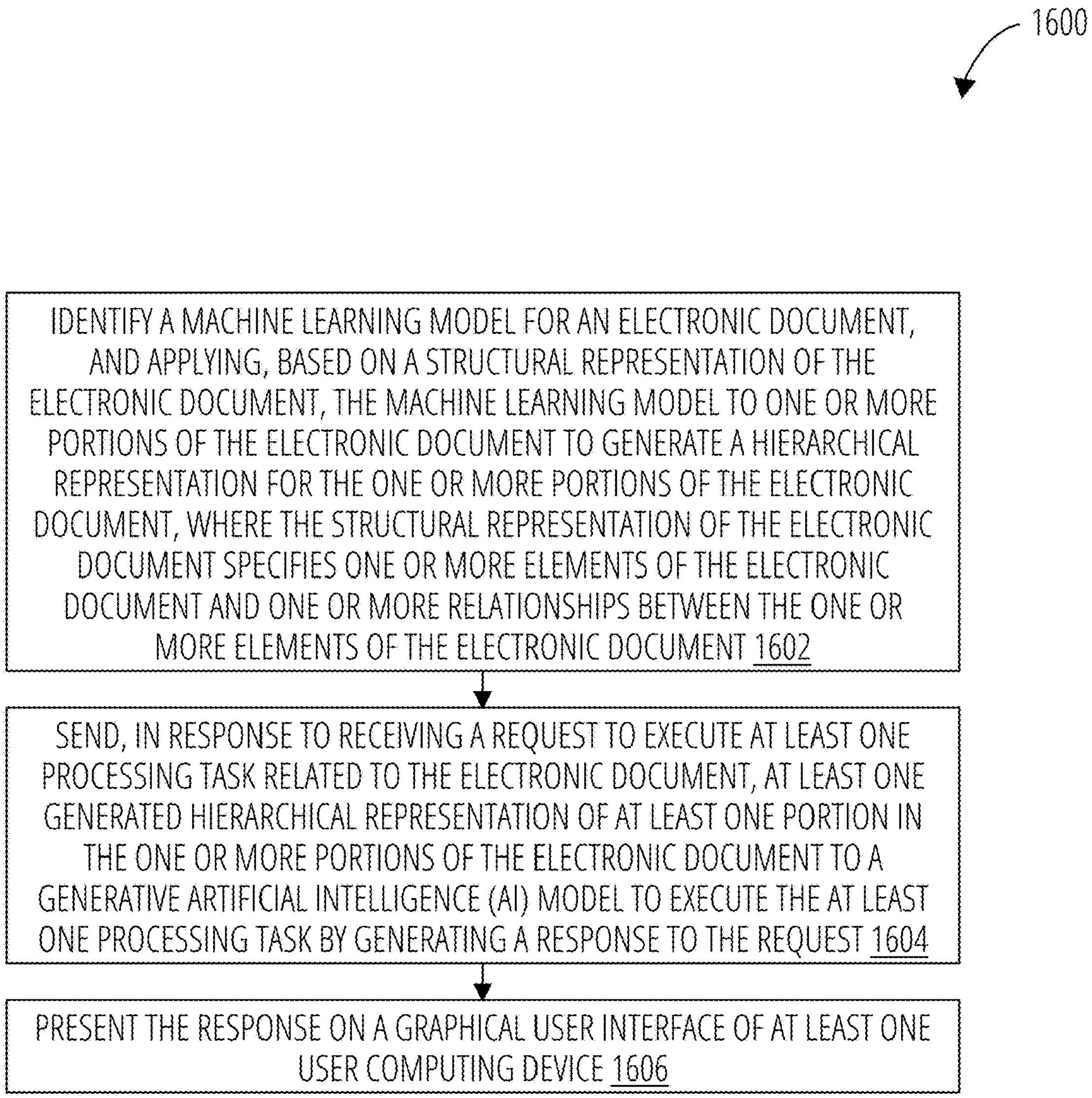

RECEIVE A REQUEST TO EXECUTE AT LEAST ONE PROCESSING TASK RELATED TO AN ELECTRONIC DOCUMENT 1702

SEND A HIERARCHICAL REPRESENTATION OF AT LEAST ONE PORTION IN ONE OR MORE PORTIONS OF THE ELECTRONIC DOCUMENT TO A GENERATIVE ARTIFICIAL INTELLIGENCE (AI) MODEL TO EXECUTE THE AT LEAST ONE PROCESSING TASK BY GENERATING A RESPONSE TO THE REQUEST, THE HIERARCHICAL REPRESENTATION BEING GENERATED BY APPLYING A MACHINE LEARNING MODEL TO ONE OR MORE PORTIONS OF THE ELECTRONIC DOCUMENT, THE MACHINE LEARNING MODEL BEING SELECTED BASED ON A STRUCTURAL REPRESENTATION OF THE ELECTRONIC DOCUMENT, THE STRUCTURAL REPRESENTATION SPECIFYING ONE OR MORE ELEMENTS OF THE ELECTRONIC DOCUMENT AND ONE OR MORE RELATIONSHIPS BETWEEN THE ONE OR MORE ELEMENTS OF THE ELECTRONIC DOCUMENT 1704

PRESENT THE RESPONSE ON A GRAPHICAL USER INTERFACE OF AT LEAST ONE USER COMPUTING DEVICE 1706

RECEIVE AT LEAST ONE FEEDBACK FROM THE AT LEAST ONE USER COMPUTING DEVICE 1708

PRESENT, IN RESPONSE TO THE RECEIVING THE AT LEAST ONE FEEDBACK, AN UPDATED RESPONSE, GENERATED BY THE GENERATIVE AI MODEL. ON THE GRAPHICAL USER INTERFACE OF THE AT LEAST ONE USER COMPUTING DEVICE 1710

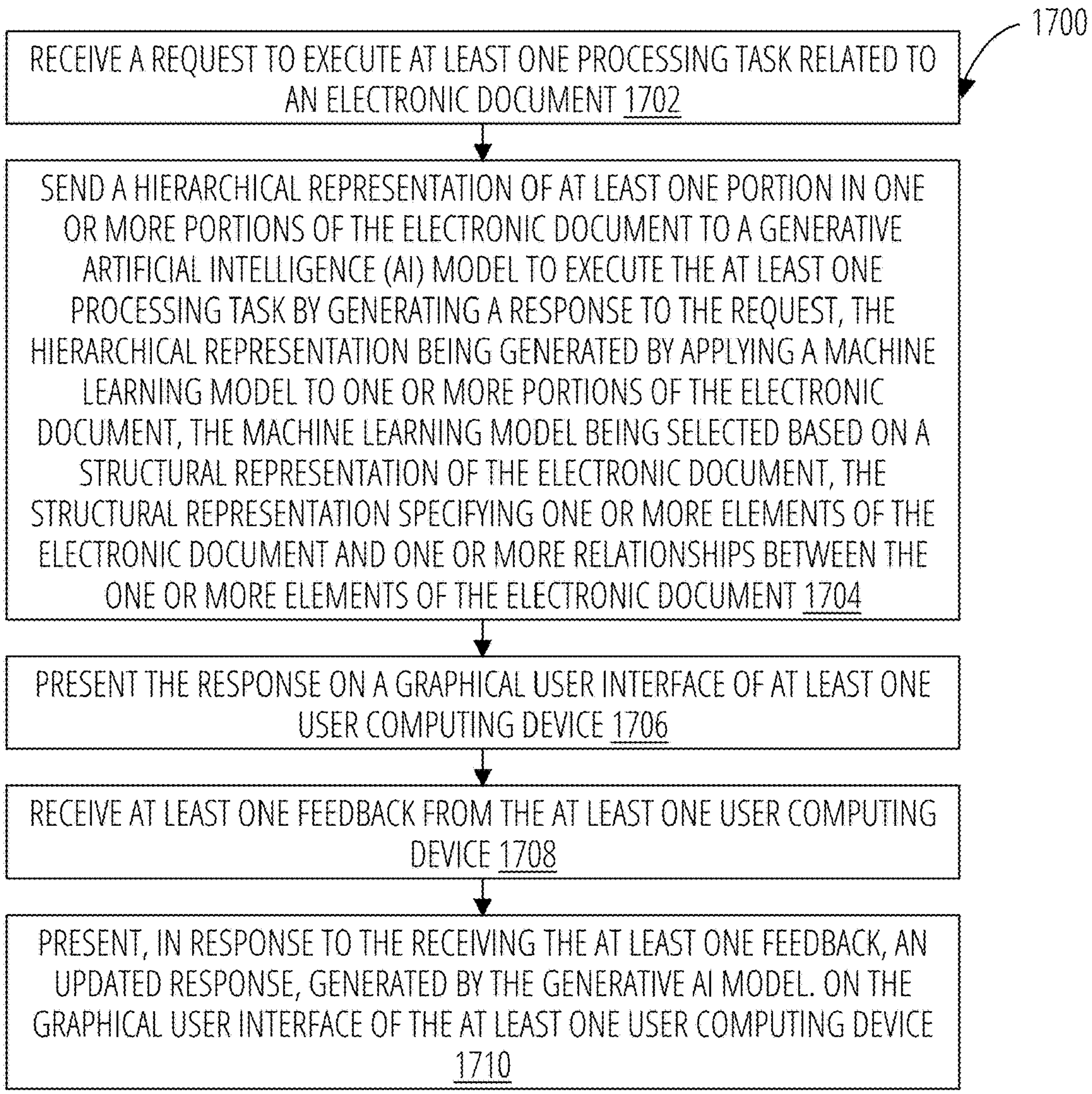

FIG. 17

ENTIRE DOCUMENT SUMMARIZATION

CROSS-REFERENCE TO RELATED APPLICATIONS

The present application claims priority to U.S. Provisional Patent Appl. No. 63/529,858 to Kota et al., filed Jul. 31, 2023, and entitled "Entire Document Summarization, and incorporates its disclosure herein by reference in its entirety.

BACKGROUND

An electronic document management platform allows organizations to manage a growing collection of electronic documents, such as electronic agreements. An electronic agreement may be tagged with a visual element for receiving an electronic signature. An electronic signature is data that is logically associated with other data and used by a signatory to sign the associated data. Due to constantly evolving legal and technical requirements imposed on electronic documents, an entire ecosystem of processes, devices, systems and networks continuously evolve around the safe and secure contract lifecycle management (CLM), such as generation, delivery, management, searching and storage of electronic documents. Summarization of documents or portions thereof is a difficult and compute-intensive operation, especially when it concerns large documents that include a substantial amount of information that may or may not be located in the same place in the document. Sometimes such summarizations are called for in response a request that is received from a user. However, conventional systems typically lack an ability to prepare proper summaries of documents/portions of documents and hence, are unable to provide its user with needed information with a high-level of accuracy.

SUMMARY

In some embodiments, the current subject matter relates to a computer implemented method for executing document summarization. The method may include generating, using at least one processor, a structural representation of an electronic document. The structural representation may specify one or more elements of the electronic document and one or more relationships between one or more elements of the electronic document. The method may also include identifying a machine learning model for the electronic document, and applying, based on the structural representation of the electronic document (and/or a particular processing task), the machine learning model to one or more portions of the electronic document to generate a hierarchical representation for one or more portions of the electronic document, receiving a request to execute at least one processing task related to the electronic document, sending at least one generated hierarchical representation of at least one portion in one or more portions of the electronic document to a generative artificial intelligence (AI) model to execute at least one processing task by generating a response to the request, and receiving the response and presenting the response on a graphical user interface of at least one user computing device.

In some example, non-limiting embodiments, the current subject matter may be configured to execute various document summarization operations, such as, performing of contextual extractions from a document in various forms, e.g., one or more key-value pairs that may be indicative and/or representative of a summary of a document and/or any portion(s) thereof. Such summarization may, for instance, but not limited to, include contextual extractions, generation of simple explanations of the document and/or any portion(s) thereof, execution of a semantic search of the document and/or any portion(s) thereof, forming and/or generating of an outline of the document and/or any portion (s) thereof, as well as any other tasks. Alternatively, or in addition, summarization may include abstractive summarization (e.g., generation of a text (e.g., one or more paragraph (s)) that may, for instance, rephrase the document and/or any of its portion(s) while capturing the essence of the rephrased document/portions) and/or extractive summarization (e.g., extraction of text from the document without performing any rephrasing thereof).

In some embodiments, the current subject matter may include one or more of the following optional features. The method may also include receiving at least one feedback from at least one user computing device, and performing, based on the received at least one feedback, at least one of the following operations. The operations may, for example, include, updating the generated structural representation of the electronic document to generate an updated structural representation of the electronic document; identifying at least another machine learning model for the electronic document and applying the another machine learning model to one or more portions of the electronic document to generate at least another hierarchical representation for one or more portions of the electronic document; updating the machine learning model identified for the electronic document to generate an updated machine learning model applying the updated machine learning model to one or more portions of the electronic document to generate an updated hierarchical representation for one or more portions of the electronic document; generating an updated hierarchical representation for at least one portion in one or more portions of the electronic document; and any combination thereof. The method may further include receiving, in response to the performing, an updated response from the generative AI model and presenting the updated response on the graphical user interface of at least one user computing device.

In some embodiments, the generating the structural representation of the electronic document may include hierarchically arranging of one or more elements based on one or more relationships between one or more elements of the electronic document. The generating of the structural representation of the electronic document may include generating one or more groups of one or more elements within hierarchically arranged one or more elements. At least one of hierarchical arrangement of one or more elements and one or more groups of one or more elements may be determined based on at least one of the following: a position of each element in one or more elements in the electronic document, a type of each element in one or more elements in the electronic document, one or more functions of each element in one or more elements in the electronic document, and any combination thereof.

In some embodiments, one or more elements may include at least one of the following: a text, an audio, a video, an image, a table, and any combination thereof.

In some embodiments, at least one processing task may include at least one of the following: a summarization of the electronic document, a summarization of at least one element in one or more elements, a contextual extraction from the electronic document, an explanation of the electronic document, an explanation of at least one element in one or more elements, an explanation of at least one portion in one or more portions, a semantic search of the electronic document, a generation of an outline of the electronic document, and any combinations thereof.

In some embodiments, the identifying may include generating the hierarchical representation for one or more portions of the electronic document based on at least one of the following: an importance parameter associated with at least one element in one or more elements, at least one processing task, a content of at least one element in one or more elements, and any combinations thereof. The importance parameter may be defined by at least one processing task. The importance parameter may further be defined by at least one of the following: a type of the electronic document, a position of each element in one or more elements in the electronic document, a type of each element in one or more elements in the electronic document, one or more functions of each element in one or more elements in the electronic document, and any combination thereof.

In some embodiments, the current subject matter relates to a system for executing document summarization. The system may include at least one processor and at least one non-transitory storage media storing instructions, that when executed by at least one processor, cause at least one processor to perform one or more of the following operations. The operations may include identifying a machine learning model for an electronic document, and applying, based on a structural representation of the electronic document, the machine learning model to one or more portions of the electronic document to generate a hierarchical representation for one or more portions of the electronic document, where the structural representation of the electronic document specifies one or more elements of the electronic document and one or more relationships between one or more elements of the electronic document; sending, in response to receiving a request to execute at least one processing task related to the electronic document, at least one generated hierarchical representation of at least one portion in one or more portions of the electronic document to a generative artificial intelligence (AI) model to execute at least one processing task by generating a response to the request; and presenting the response on a graphical user interface of at least one user computing device.

In some embodiments, the operations may further include receiving at least one feedback from at least one user computing device, and performing, based on the received at least one feedback, at least one of the following: updating the generated structural representation of the electronic document to generate an update structural representation of the electronic document; identifying at least another machine learning model for the electronic document and applying the another machine learning model to one or more portions of the electronic document to generate at least another hierarchical representation for one or more portions of the electronic document; updating the machine learning model identified for the electronic document to generate an updated machine learning model applying the updated machine learning model to one or more portions of the electronic document to generate an updated hierarchical representation for one or more portions of the electronic document; generating an updated hierarchical representation for at least one portion in one or more portions of the electronic document; and any combination thereof; and receiving, in response to the performing, an updated response from the generative AI model and presenting the updated response on the graphical user interface of at least one user computing device.

In some embodiments, the generating the structural representation of the electronic document may include hierarchically arranging of one or more elements based on one or more relationships between one or more elements of the electronic document, and generating one or more groups of one or more elements within hierarchically arranged one or more elements. At least one of hierarchical arrangement of one or more elements and one or more groups of one or more elements may be determined based on at least one of the following: a position of each element in one or more elements in the electronic document, a type of each element in one or more elements in the electronic document, one or more functions of each element in one or more elements in the electronic document, and any combination thereof.

In some embodiments, at least one processing task may include at least one of the following: a summarization of the electronic document, a summarization of at least one element in one or more elements, a contextual extraction from the electronic document, an explanation of the electronic document, an explanation of at least one element in one or more elements, an explanation of at least one portion in one or more portions, a semantic search of the electronic document, a generation of an outline of the electronic document, and any combinations thereof.

In some embodiments, the identifying operation may include generating the hierarchical representation for one or more portions of the electronic document based on at least one of the following: an importance parameter associated with at least one element in one or more elements, at least one processing task, a content of at least one element in one or more elements, and any combinations thereof. The importance parameter may be defined by at least one of the following: at least one processing task, a type of the electronic document, a position of each element in one or more elements in the electronic document, a type of each element in one or more elements in the electronic document, one or more functions of each element in one or more elements in the electronic document, and any combination thereof.

In some embodiments, the current subject matter relates to a computer program product comprising a non-transitory machine-readable medium storing instructions that, when executed by at least one programmable processor, cause at least one programmable processor to perform operations that may include receiving a request to execute at least one processing task related to an electronic document; sending a hierarchical representation of at least one portion in one or more portions of the electronic document to a generative artificial intelligence (AI) model to execute at least one processing task by generating a response to the request, the hierarchical representation being generated by applying a machine learning model to one or more portions of the electronic document, the machine learning model being selected based on a structural representation of the electronic document, the structural representation specifying one or more elements of the electronic document and one or more relationships between one or more elements of the electronic document; presenting the response on a graphical user interface of at least one user computing device; receiving at least one feedback from at least one user computing device; and presenting, in response to the receiving at least one feedback, an updated response generated by the generative AI model on the graphical user interface of at least one user computing device. The current subject matter may include one or more optional features as discussed herein.

Any of the above embodiments may be implemented as instructions stored on a non-transitory computer-readable storage medium and/or embodied as an apparatus with a memory and a processor configured to perform the actions described above. It is contemplated that these embodiments may be deployed individually to achieve improvements in resource requirements and library construction time. Alternatively, any of the embodiments may be used in combination with each other in order to achieve synergistic effects, some of which are noted above and elsewhere herein.

BRIEF DESCRIPTION OF THE DRAWINGS

To easily identify the discussion of any particular element or act, the most significant digit or digits in a reference number refer to the figure number in which that element is first introduced.

FIG. 14 illustrates an example process for executing a summarization of an electronic document, according to some embodiments of the current subject matter.

FIG. 16 illustrates another example process for executing a summarization of an electronic document, according to some embodiments of the current subject matter.

FIG. 17 illustrates yet another example process for executing a summarization of an electronic document, according to some embodiments of the current subject matter.

DETAILED DESCRIPTION

Figure 1:
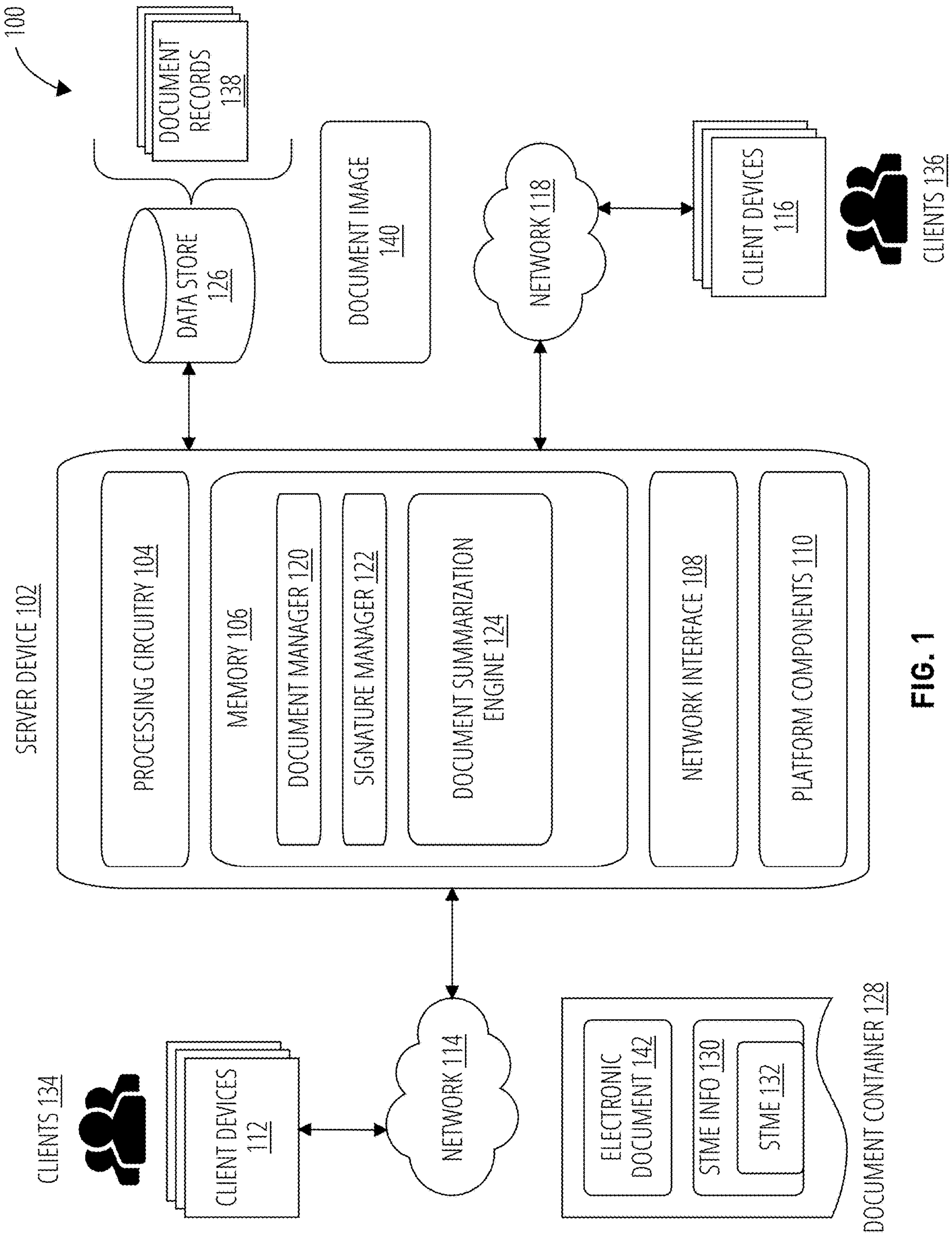
FIG. 1 illustrates a system in accordance with one embodiment.

Embodiments disclosed herein are generally directed to techniques for generating documents and/or various summaries of such documents using a graphical user interface, where such document generation is assisted through use of machine learning models and artificial intelligence architectures. In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally-binding agreement. Parties to an agreement can review, revise and sign the agreement from anywhere around the world on a multitude of electronic devices, such as computers, tablets and smartphones.

In some embodiments, the current subject matter may be configured to provide a framework for processing and/or understanding electronic documents. This may be accomplished through several phases, such as, for example, generation of a structure or a structural representation of a document, selection or identification of various portions and/or snippets from the document, performance of task-specific processing (e.g. summarization, contextual extractions, simple explanation, semantic search, outline generation, etc.), and providing an output to the user so that the user can provide feedback that may be used to update one or more of the previous phases.

In some embodiments, the current subject matter may be configured to execute various document summarization operations. These may include, but are not limited to, for example, performing of contextual extractions from a document in various forms, e.g., one or more key-value pairs that may be indicative and/or representative of a summary of a document and/or any portion(s) thereof. Summarization may also encompass one or more varying scope operations, which, as stated above, may include contextual extractions, generation of simple explanations of the document and/or any portion(s) thereof, execution of a semantic search of the document and/or any portion(s) thereof, forming and/or generating of an outline of the document and/or any portion (s) thereof, as well as any other tasks. Moreover, the summarization operations may also include various abstractive summarization operations and/or extractive summarization operations. A non-limiting example of the abstractive summarization operation may involve generation of a text (e.g., one or more paragraph(s)) that may, for instance, rephrase the document and/or any of its portion(s) while capturing the essence of the rephrased document/portions. A non-limiting example of the extractive summarization operation may involve extraction of text from the document without performing any rephrasing thereof.

As part of document structure generation phase, the current subject matter may be configured to receive and/or ingest an electronic document that may be represented in any desired format (e.g., .pdf, .docx, etc.). Moreover, the document may include, for instance, text, graphics, images, tables, audio, video, computing code (e.g., source code, etc.) and/or any other type of media. An output of this phase may include a tree-like structure that may represent a hierarchical structure of the document that may identify its various elements (e.g., heading, section, paragraph, sentence, table, image, video, etc.) and relationships between the elements. The relationships may, for instance, be defined by one or more sections being included under a specific heading; a first section including five paragraphs with first three paragraphs including four sentences, and last two paragraphs including two sentences; a second section including a paragraph and a table; a third section including a graphic; etc. As can be understood, these examples are non-limiting and other structural relationships and/or elements of a document may be organized into the tree-like structure. Further, various functions of elements may be reflected for each type of element, such as, for example, some text elements may be headings, sub-headings, paragraphs, etc. Elements belonging to the same parent may also have an order, such as, for example, a sequence of paragraphs within a section.

In the document portion selection phase, the current subject matter may use the generated tree-like structure of the electronic document along with the document's elements and corresponding relationships to generate various subsets related to the document. Each subset may be based on a specific selection criterion/a that may conform to a particular task that may be received from a user (e.g., "summarize termination clause of the sales contract," "describe liabilities in the event of a breach of contract," etc.).

The selection criteria may be based on at least one of the following: the generated document structure along with positions of document's elements in that structure, a content of one or more elements in the document, and an importance parameter that may be associated with a particular task received from the user. For instance, to summarize an agreement document, the title of the agreement and few paragraphs on the first page of the agreement document may be considered to be more important and/or relevant to a particular task (e.g., "provide title and summary of consideration for an agreement") than a paragraph in the middle of the document. It should be noted that position of an element alone in the tree structure might not be sufficient for completion of a particular task enough (e.g., a paragraph in the middle of the document mentioning a key and/or highly important clause on the termination of the agreement may be important for summarization).

In some embodiments, document portions may be selected and/or identified based on one or more machine learning (ML) models. The ML models may be trained using one or more features associated with electronic documents, portions of documents, importance factors, etc. For example, the features may include at least one of: type(s) of electronic document(s), various content elements of electronic document(s), type(s) of task(s), position of elements in document (s), types of element(s), function(s) of element(s), and/or any other features and/or any combination thereof. The models may be trained using historical data associated with prior tasks, use of document(s), and/or any other information. Moreover, the training may involve re-training and/or refresh-training based on use of models/user feedback, etc. In some embodiments, the models may rely on labeled (e.g., labeling elements within a document as important), and/or unlabeled datasets.

In some embodiments, an output of this phase may be presented based on specific importance factors, such as, for example, an importance of a particular element, an importance of elements for one or more contextual extractions, importance of elements for a particular task received from the user, and/or any other importance factors and/or any combination thereof. The output may be presented as one or more tree or hierarchical representation associated with a specific importance factor. Each such tree/hierarchical representation may be represented in a form of tags, linkages, nodes, vectors, multi-class vectors, etc.

Once document portions of the electronic document have been selected and/or identified (e.g., for a specific task), task-specific processing phase may be executed. Additionally, task-specific input may also be provided, such as, for example, a selected text to be explained in a simple explanation task, a query in a semantic search task, and/or any other types of tasks. The output of this phase may include a task-specific output, such as, for example, a short summary of the electronic document, a long summary of the electronic document, one or more contextual extractions from the electronic document, an outline of the electronic document, etc. As can be understood, the current subject matter is not limited to the execution of the above tasks and/or generation of task-specific outputs. For example, as stated above, one or more contextual document extractions may be executed to output one or more key-value pairs that summarize and/or, otherwise, indicate and/or represent a summary of the document and/or any of its portions. Moreover, as part of the tasks, one or more simple explanations of the document/document portion(s) may be generated, document semantic search(es) may be performed, an outline of the document/portion(s) may be generated, etc. Alternatively, or in addition, tasks (and/or corresponding outputs) may involve extraction of one or more portions of the document (and/or entire document) and presenting them in an original and/or rephrased form, the latter of which may provide a concise and/or simplified explanation of the extracted subject matter. In some embodiments, one or more one or more generative artificial intelligence (AI) models may be used.

The generative AI models may be part of the current subject matter system and/or be one or more third party models (e.g., ChatGPT, Bard, DALL-E, Midjourney, DeepMind, etc.). In some embodiments, the generative AI model may be provided with selected document portions of the electronic document, the electronic document itself, and/or a description of the specific task and may use the provided information to generate one or more responses to the specific task (e.g., as stated above, a short summary of the document, etc.). For example, the generative AI model may be provided with the sales agreement, one or more selected portions of the agreement related to termination, and may be asked to provide a summary of termination provisions. The generative AI model may be configured to generate one or more summar(ies), guidance(s), instruction(s) and/or directive(s) based on analysis of this information. In some embodiments, summar(ies), guidance(s), instruction(s) and/or directive(s) may be limited to the specific task and/or document. The summar(ies), guidance(s), instruction(s) and/or directive(s), which may be user-friendly, may be generated in any desired format and/or form. The summar(ies), guidance(s), instruction(s) and/or directive(s) may also include explanations of tasks/document/portion of document and outline what other information/documents/actions may be needed.

In some embodiments, the user may be presented with the output from the generative AI model and may provide feedback (e.g., "thumbs up", "thumbs down", vote, written feedback, etc.). The feedback may be used to update, revise, modify, delete, change, and/or perform any other operations with regard to how one or more prior operations associated with one or more phases, as discussed herein, have been performed. Alternatively, or in addition, the feedback may be used to update, revise, modify, delete, change, and/or perform any other operations with regard to a particular output that may have been generated as a result of any of the previous phases, as discussed herein. Such operations (e.g., updates, revision, etc. to how operations are performed and to the output) may be performed simultaneously, one after the other, and/or in any other desired fashion. Further, these operations may be executed in real-time, as soon as feedback is received, and/or at any other desired time. In some example embodiments, the feedback may be fed back into one or more of the previous phases, and may be used to adjust and/or finetune, for example, how a document structure may be generated, how portions of document may be selected, how processing of specific tasks may be performed using the generative AI model, etc. For example, too many thumbs down on summaries of lengthy documents, may mean that criteria for selecting portions of document may need be adjusted to account for more important content, etc. User feedback may be used to update document tree-like structure, train and/or re-train and/or refresh train one or more models used for selection of portions of document to improve selection of portions of document, refine prompts submitted to the generative AI models, and/or for any other purpose(s).

In some embodiments, the current subject matter may be configured to execute a process for summarizing of an electronic document. The electronic document may be any type of document, e.g., an agreement, an application for a credit card, a computer program, etc. As discussed above, the process may be initiated by receiving and/or generating a structural representation of the electronic document. The structural representation may be configured to specify one or more elements of the electronic document and one or more relationships between such elements. The structural representation may be expressed in a tree-like and/or hierarchical format (e.g., a title of the document may be a root node of the document; section of the document may be next-level nodes under the root node; and so on).

In some embodiments, the structural representation may include one or more groups of elements within hierarchically arranged elements. The hierarchical arrangement of the elements and/or groups of elements may be determined based on at least one of the following: a position of each element in the electronic document, a type of each element in the electronic document, one or more functions of each element in the electronic document, etc., and/or any combinations thereof. For example, the elements may be grouped based on a specific subject (e.g., termination provisions of agreement), a specific location in the document (e.g., where "whereas" clauses are located), a specific function of an element (e.g., tables, etc.), etc. The elements include at least one of the following: a text, an audio, a video, an image, a table, and/or any combinations thereof.

A machine learning model may then be identified for the electronic document (e.g., a sales agreement ML model for a sales agreement electronic document). The identified model may then be applied, based on the structural representation of the electronic document, to one or more portions of the electronic document to generate a hierarchical representation for each selected and/or identified portion of the electronic document. The hierarchical representation of such selected and/or identified portions may be based on various importance parameters or factors. For example, such importance parameters may be associated with at least one element of the electronic document, at least one processing task that may be received from a user (e.g., "summarize termination provisions for this sales agreement"), a content of element(s) in the electronic document, functions of element(s), and/or any other factors and/or any combinations thereof. The importance parameter(s) may be specifically defined by the processing task received from the user. Moreover, the importance parameters may be defined by at least one of the following: a type of the electronic document, a position of each element in the electronic document, a type of each element in the electronic document, one or more functions of each element in the electronic document, and and/or any other parameters and/or any combination thereof.

The process may then proceed to receive a request from the user (e.g., from user's computing device) to execute at least one processing task related to the electronic document (e.g., as stated above, "summarize termination provisions for this sales agreement"). In some embodiments, the processing task may include at least one of the following: a summarization of the electronic document, a summarization of at least one element, a contextual extraction from the electronic document, an explanation of the electronic document, an explanation of at least one elements, an explanation of at least one portion of the document, a semantic search of the electronic document, a generation of an outline of the electronic document, and/or any combinations thereof.

The request may then be parsed and/or analyzed to determine specifics of the task at hand. Then, the generated hierarchical representation of at least one portion of the electronic document may be sent to a generative artificial intelligence (AI) model to execute the processing task and generate a response to the request. The response to the request may then be presented to the user on a graphical user interface of the user's computing device.

In some embodiments, the user may provide a feedback (e.g., thumbs up, thumbs down, etc.) to the response. In response to the feedback, the current subject matter may be configured to perform at least one of the following. The generated structural representation of the electronic document may be updated to generate an update structural representation of the electronic document. Moreover, at least another machine learning model may be identified for the electronic document. Such model may be applied to one or more portions of the electronic document to generate at least another hierarchical representation for each of portion of the electronic document. Alternatively, or in addition, the initially selected machine learning identified for the electronic document may be updated to generate an updated machine learning model. The updated machine learning model may then be applied to one or more portions of the electronic document to generate an updated hierarchical representation for each portion of the electronic document. Further, an updated hierarchical representation for at least one portion in the electronic document may be generated. As can be understood, any other processes may be performed. In response to such processes, an updated response from the generative AI model may be received and presented on the graphical user interface of the user computing device.

One of the technical benefits of the current subject matter is that it provides for a dynamic generation of summaries of electronic documents based on structural representations of the documents. This enables execution of specific task(s) triggered by request(s) from users more efficient by reducing use of compute resources that may typically be consumed by generative AI models in performing of complete document analysis. Some conventional systems typically analyze an entire document to generate its synopsis. This consumes a substantial amount of computing resources and takes a long time to complete, especially for large documents. Further, oftentimes, such systems generate incorrect document summaries with glaring omissions and errors leading to undesired consequences.

An additional technical benefit to the current subject matter is its ability to execute tasks, not only expeditiously, but more accurately. As the generative AI models are presented with selected information that may be related to a specific task, there are substantially fewer errors that may occur during execution of that task. This is because the amount of information such generative AI models need to process is significantly smaller, thereby decreasing changes of an incorrect output. Existing systems lack an ability to identify such specific document sections for the purposes of execution of a particular task. Instead, full documents are analyzed and summarized, which enhances possibilities of errors and mistakes.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 19:
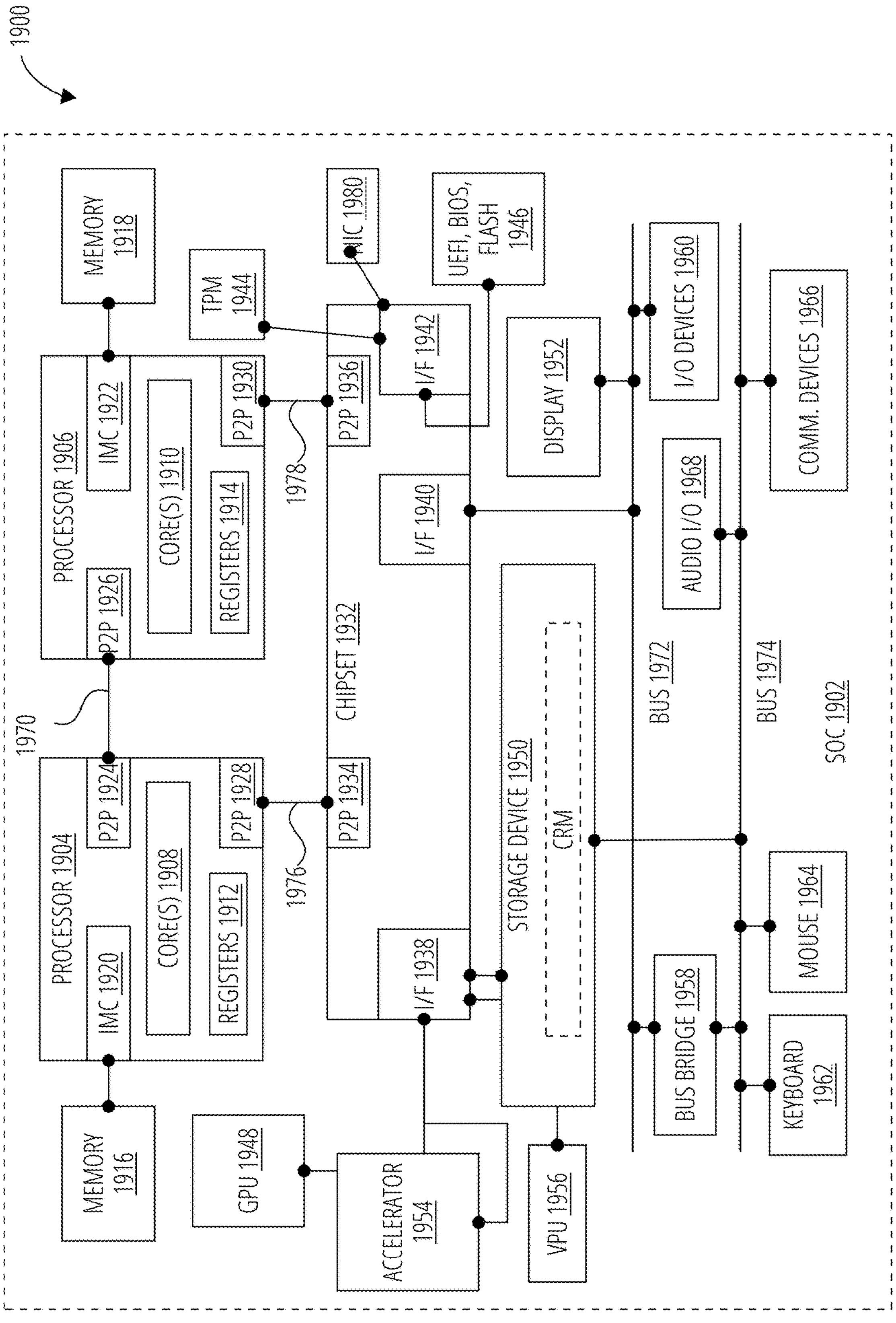
FIG. 19 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1900 as depicted in FIG. 19.

Figure 20:
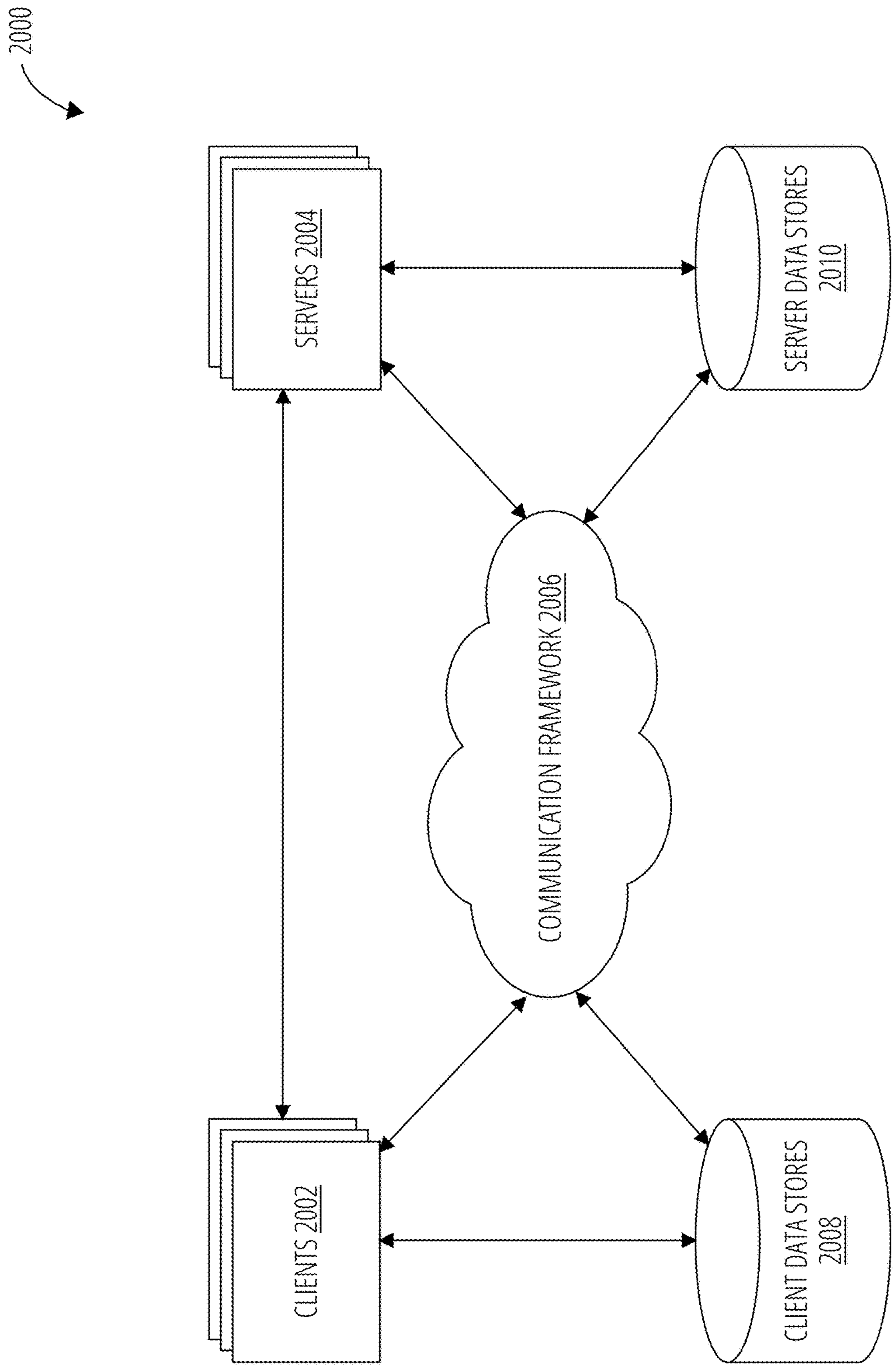
FIG. 20 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2000 as depicted in FIG. 20.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a document summarization engine 124, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more work flows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and work flows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140, and send the signed document image 140 to the server device 102 for verification, recordation, and storage.

Figure 5:
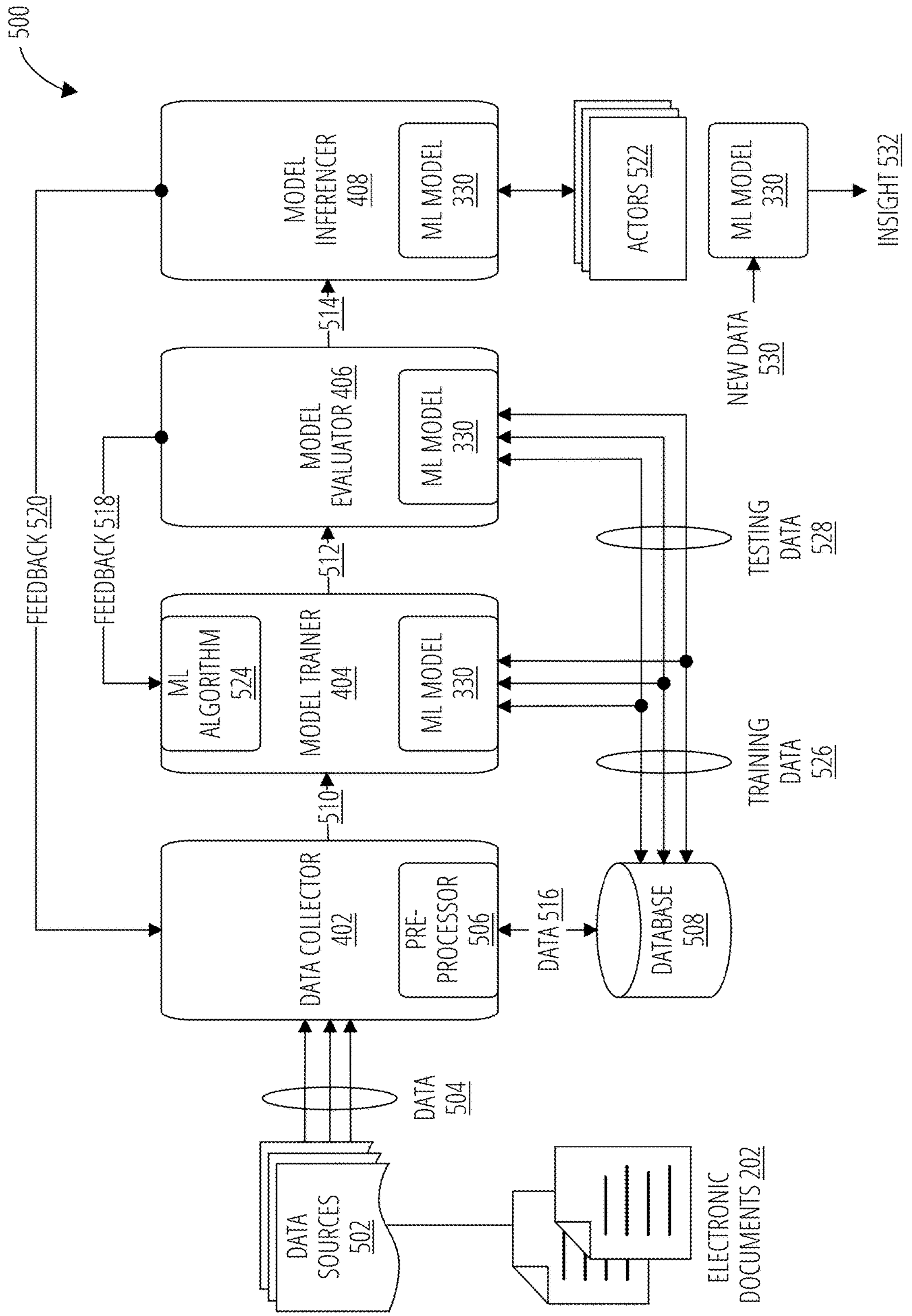
FIG. 5 illustrates an artificial intelligence architecture that may be used by the training device to generate the ML model (e.g., as shown in FIG. 2) for deployment by the inferencing device.

The document summarization engine 124 may implement and/or manage various artificial intelligence (AI) and machine learning (ML) agents to assist in various operational tasks for the EDMP of the system 100. The AI/ML agents and their operation associated with the document summarization engine 124, and associated software elements, are described in more detail with reference to an artificial intelligence architecture 500 as depicted in FIG. 5. The document summarization engine 124, and associated hardware elements, are described in more detail with reference to a computing architecture 1900 as depicted in FIG. 19.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 7:
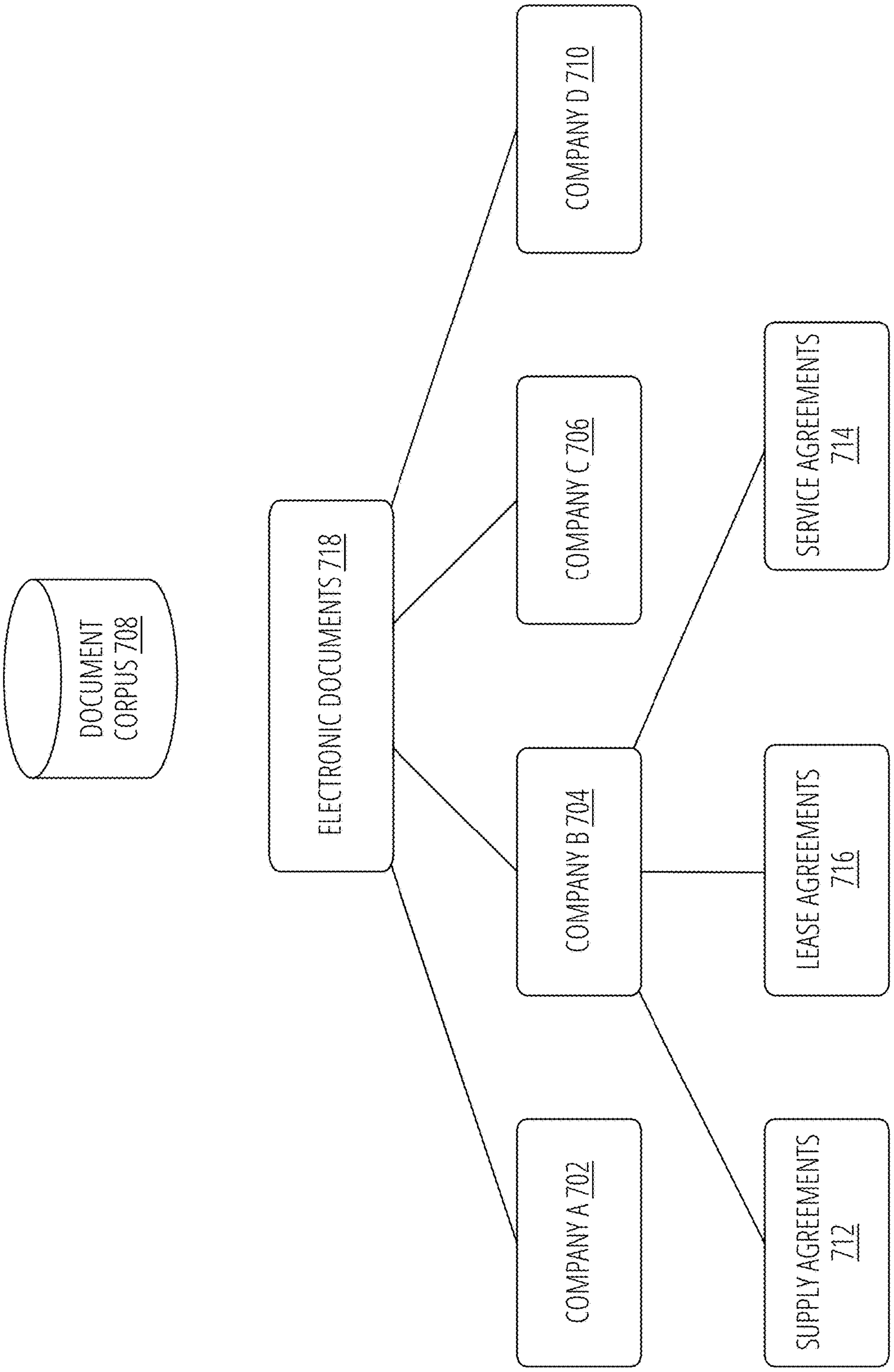
FIG. 7 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718, as shown in FIG. 7, with tools, applications, and work flows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more work flows developed by Adobe Systems Incorporated. The STME 132 input may be received from and generated by work flows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally-written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, as discussed above, the system 100 may include a document summarization engine 124. The document summarization engine 124 may implement a set of tools and/or algorithms to summarize an electronic document and/or any parts thereof. The document summarization engine 124 may be configured to receive and/or generate a structural representation of an electronic document. The structure representation of the document may be generated by one or more external computing entities and provided to the document summarization engine 124. The structural representation may specify elements (e.g., heading, sections, sentences, tables, etc.) of the electronic document and relationship(s) among the elements (e.g., first section includes two sentences and a table, etc.). The structural representation may be a tree-like structure that includes a hierarchical arrangement of the elements. The arrangement may be based on relationships between elements and/or any other factors. Further, the elements may be grouped into one or more groups. The groupings may be based on various factors, such as, for example, a position of each element in the electronic document, a type of each element, one or more functions of elements, etc.

The document summarization engine 124 may then identify one or more machine learning models for the electronic document. The models may be specific to the particular document (e.g., a sales agreement model may be identified for a sales agreement, etc.). Such models may be trained based on historical data that may be labeled and/or unlabeled. The models may also be re-trained and/or refresh-trained, which may be executed based on user feedback and/or any updated data that may be provided for training, re-training, refresh-training, etc. of the models. The document summarization engine 124 may use the structural representation of the electronic document to apply identified models to the electronic document. Application of the models may result in generation of a hierarchical representation for one or more or each portion of the electronic document, where such portion(s) may be selected and/or identified by the document summarization engine 124, which may or may not be relevant to particular processing task(s). The hierarchical representations for such portions may be based on importance parameter associated with at least one element in the document, one or more processing tasks received from the user, a content of at least one element in the document, etc. The importance parameter may be defined by the processing task(s). In some embodiments, the importance parameter may be defined by a type of the electronic document, a position of each element in the electronic document, a type of each element in the electronic document, one or more functions of each element in the electronic document, etc. The document summarization engine 124 may be configured to store such parameters and/or determine them based on the received task(s).

As stated above, the document summarization engine 124 may receive a request to execute one or more tasks as related to the electronic document. The requests may be sent from a user's computing device. The task(s) may involve a summarization of the electronic document, a summarization of at least one element in the document, a contextual extraction from the electronic document, an explanation of the electronic document, an explanation of at least one element in the document, an explanation of at least one portion of the document, a semantic search of the document, a generation of an outline of the document, and/or any other task(s), and any combinations thereof. The document summarization engine 124 may then send the generated hierarchical representations of portions of the electronic document to a generative artificial intelligence (AI) model platform to execute the task(s) and generate a response to the request. The document summarization engine 124 may be configured to send only those hierarchical representations that may be relevant to the specific task(s). Once the response is received, it may be presented on a graphical user interface of at least one user computing device. The generative AI model platform may be part of the document summarization engine 124 and/or be an external generative AI model. The generative artificial intelligence (AI) platform may use a large language model (LLM) to assist in execution of a particular task.

In some embodiments, the document summarization engine 124 may receive (and/or request to receive) a feedback from the user (e.g., via the user's computing device). In response to the feedback, the document summarization engine 124 may update the generated structural representation of the electronic document and generate an update structural representation of the electronic document. It may also identify another machine learning model for the electronic document and apply it to portions of the electronic document to generate another hierarchical representation for each portion of the document. Alternatively, or in addition, the document summarization engine 124 may update the machine learning model identified for the document to generate an updated machine learning model and apply it to portions of the document to generate an updated hierarchical representation for portions of the document. Further, the document summarization engine 124 may generate an updated hierarchical representation for at least one portion of the document, which such portion(s) may be selected and/or identified by the engine 124. As can be understood, the document summarization engine 124 may perform any other task, which may include training, re-training, refresh-training, etc. of any machine learning models, generation of refined inputs to the generative AI model platform, etc. The generative AI model platform may then generate an updated response for presentation on the graphical user interface of the user's computing device.

As stated above, in some embodiments, the document summarization engine 124 may implement a generative AI model platform locally on the server device 102. Alternatively, or in addition, the document summarization engine 124 may access a generative AI model remotely on another server device. In the latter scenario, the document summarization engine 124 may send a natural language generation (NLG) request (e.g., "provide a summary of termination clauses of sales contract") and/or any other type of request to the generative AI model implemented on another device over a network. In the former scenario, the generative AI model may include a machine learning model that implements a large language model (LLM) to support natural language processing (NLP) operations, such as natural language understanding (NLU), natural language generation (NLG), and other NLP operations. The response, as generated by the generative AI model platform, to the task may be presented in a natural language representation of a human language, such as, for example, English, French, Spanish, Korean, and so forth. The document summarization engine 124 may receive a NLG response from the generative AI model implemented by the other server device. The document summarization engine 124 may then present the response to the user via a graphical user interface (GUI) on a user's computing device.

Figure 2:
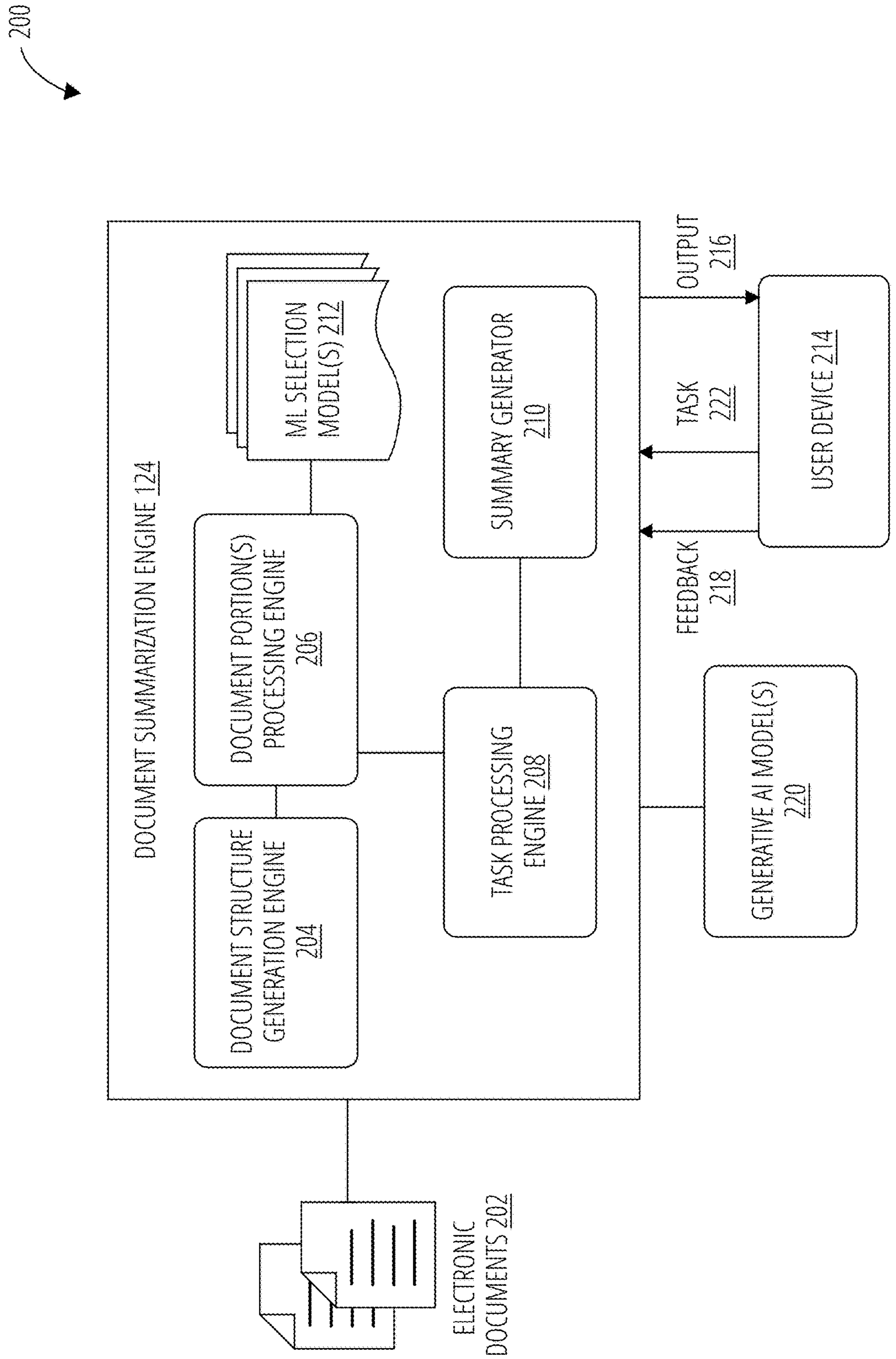
FIG. 2 illustrates an example system showing operation of a document summarization engine shown in FIG. 1, according to some embodiments of the current subject matter.

FIG. 2 illustrates an example system 200 showing operation of the document summarization engine 124, according to some embodiments of the current subject matter. The document summarization engine 124 may include a document structure generation engine 204, a document portion(s) processing engine 206, a task processing engine 208, and a summary generator 210. The document summarization engine 124 may also be communicatively coupled to one or more user devices 214. The engine 124 may also be communicatively coupled to the generative AI model(s) platforms 220. In some embodiments, one or more electronic documents 202 may be received by the engine 124 for the purposes of summarization.

One or more components of the system 200 shown in FIG. 2 may include any combination of hardware and/or software and/or may be disposed on one or more computing devices, such as, server(s), database(s), personal computer(s), laptop (s), cellular telephone(s), smartphone(s), tablet computer(s), virtual reality devices, and/or any other computing devices and/or any combination thereof. Further, one or more of such components may be disposed on a single computing device and/or may be part of a single communications network. Alternatively, or in addition to, such components may be separately located from one another. A component may be a computing processor, a memory, a software functionality, a routine, a procedure, a call, and/or any combination thereof that may be configured to execute a particular function associated with the current subject matter's system. Alternatively, or in addition, one or more such components may include network-enabled computers (e.g., a computer device, or communications device including, such as, for instance, a server, a network appliance, a personal computer, a workstation, a phone, a smartphone, a handheld PC, a personal digital assistant, a thin client, a fat client, an Internet browser, or other device.

In operation, one or more electronic documents 202 may be supplied to the document summarization engine 124. The documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

In some embodiments, electronic documents 202 may include one or more elements. Examples of such elements may include pages, headings, sub-headings, sections, paragraphs, sentences, tables, images, and/or any other type of elements. One or more elements may also be associated and/or assigned one or more functions (e.g., a document title, a text heading, a text paragraph, etc.). Further, elements may also be associated with various contextual features. For example, in a sales agreement, elements may be associated with term, termination, sales and payment structure(s), etc.

Figure 10:
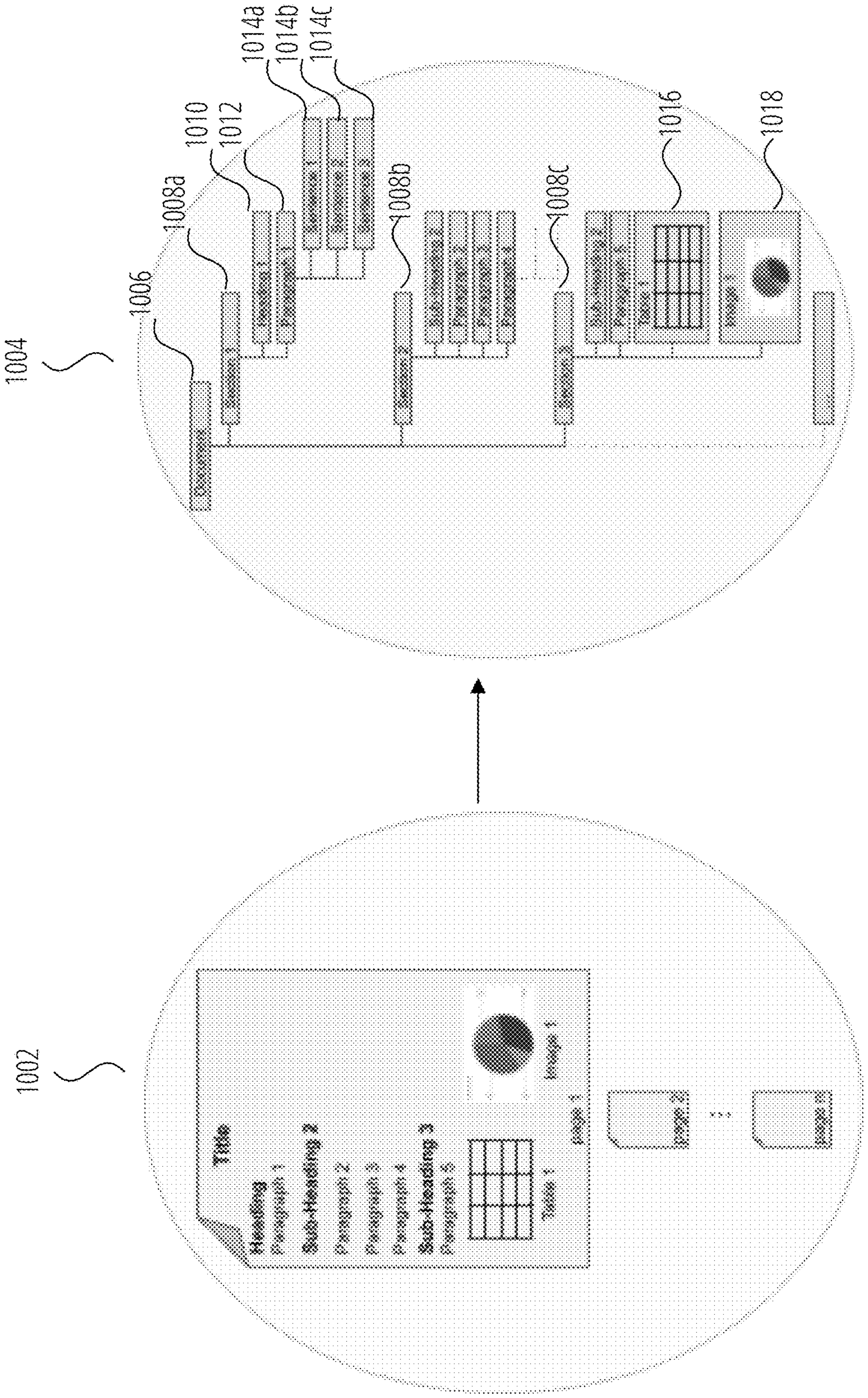
FIG. 10 illustrates an example of such structural representation or document structure of an electronic document, according to some embodiments of the current subject matter.

Upon receiving an electronic document, the document structure generation engine 204 of the document summarization engine 124 may be configured to generate one or more structural representations of the document, such as, a structural representation 1004 that is shown in FIG. 10. In some instances, the structural representation may include a tree-like arrangement of elements. The structural representation may also include an indication of one or more functions of elements in the electronic document. Further, in some embodiments, the document structure generation engine 204 may be configured to generate the structural representation of the electronic document by hierarchically arranging of the elements based on relationships between elements of the electronic document electronic document 202.

For example, (as shown in FIG. 10), the structural representation may include a root heading that may correspond to the document (and/or a title of the document), one or more sub-headings under the root heading that may correspond to sections of the document, further sub-sub-sub headings under the sub-headings corresponding to paragraphs, subsections, etc. As can be understood, the structural representation may have any desired form, such as for, example, but not limited to, a node-like structure, a linked list, and/or any other type of structure (e.g., simple graphs, directed graphs, undirected graphs, weighted graphs, adjacency matrices, adjacency lists, adjacency sets, etc.).

In some embodiments, the engine 204 and/or alternatively, the document portion(s) processing engine 206, may group elements into one or more groups based on various factors, element functions, document structure, syntax, layout, order of appearance in the document, etc. For example, in a sales agreement, elements (e.g., provisions, sections, paragraphs, sentences, etc.) related to termination of the agreement (which may be located in different section of the agreement) may be grouped together in the structural representation of the document. Elements related to pricing terms may also be grouped under the same hierarchical element in the structural representation. In some embodiments, elements may be grouped based on a position of each element in the electronic document, a type of each element in the electronic document, one or more functions of each element in the electronic document, etc. and/or any combinations thereof. Alternatively, or in addition, the engine 204 and/or engine 206 may group all tables (e.g., functions) together. Grouping of elements may be helpful during subsequent task processing phase of document summarization. For example, a task may request summarization of all pricing structures that may be expressed in tables in the agreement. Grouping of such tables may enable the generative AI model(s) 220 to execute analysis of the grouped tables only and provide an appropriate response to the received task.

Alternatively, or in addition, the document structure generation engine 204 may be configured to be an entity that may be external to the document summarization engine 124. Once the document structure generation engine 204 generates such structural representation of the document, it may send the generated structural representation to the document summarization engine 124 for further processing. The document summarization engine 124 may include one or more application programming interfaces (APIs) that may be configured to receive the generated structural representation of the document and determine further processing operations (as discussed herein).

Once the structural representation of the document 202 has been generated and/or received, the document portion(s) processing engine 206 of the document summarization engine 124 may be configured to select a predetermined machine learning (ML) selection model from a plurality of such ML selection model(s) 212 (such as those discussed in connection with FIGS. 3-5 below). The models may be selected based on a specific user processing task that may be received. For example, a processing task relating to summarization of termination provisions in the agreement may cause the document portion(s) processing engine 206 to identify and select a model 212 that may be trained to identify portions of the electronic document related to termination. The models 212 may be trained using labeled, partially-labeled, and/or unlabeled data, and/or any other type of data. Moreover, the models 212 may be re-trained, refresh-trained, etc. based on user feedback that may be received from user device 214 in response to output 216 provided to the user device 214.

Figure 12:
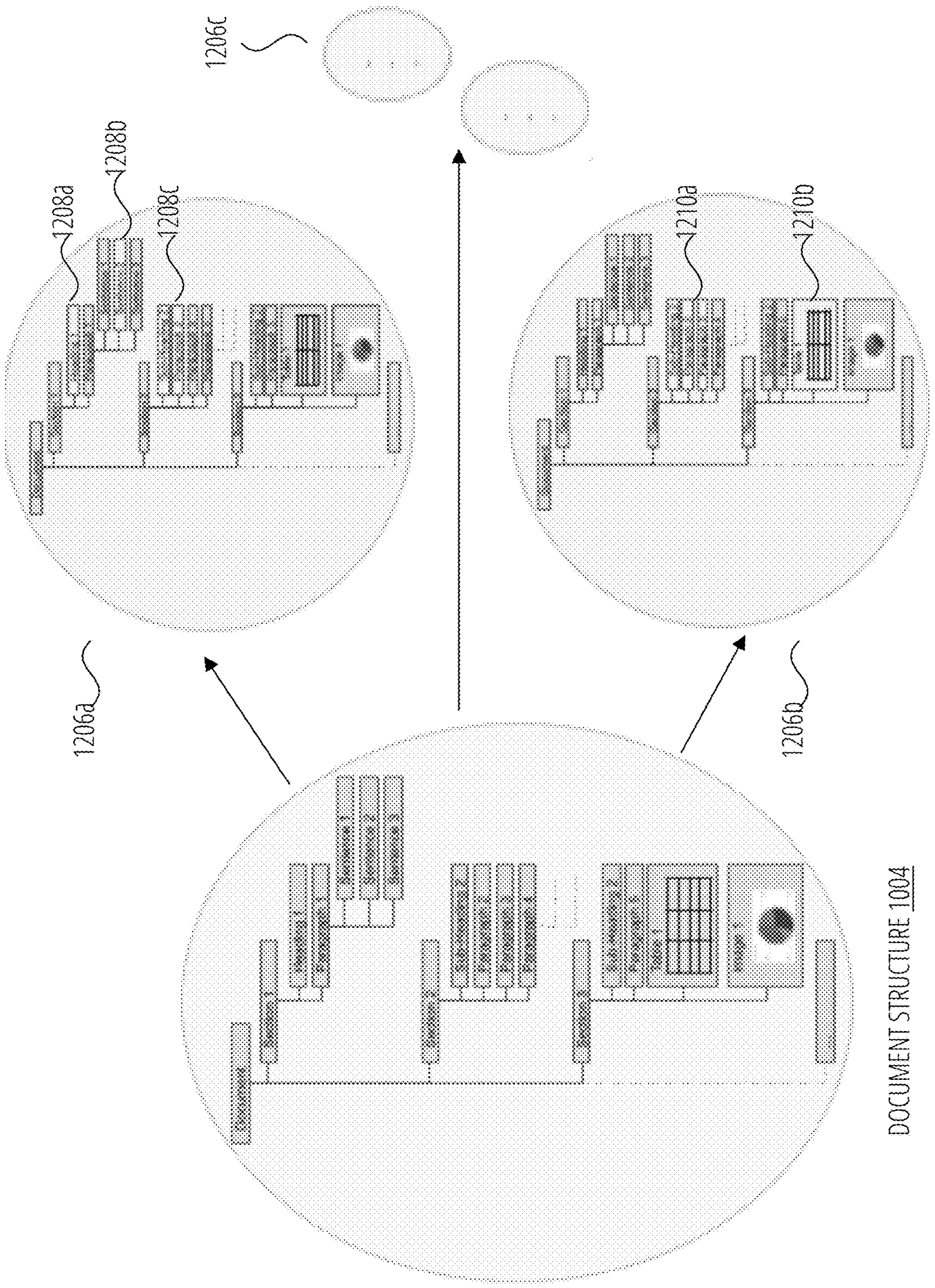
FIG. 12 illustrates examples of such output by the document portion(s) processing engine (after application of the selected ML selection model(s) shown in FIG. 2), according to some embodiments of the current subject matter.

The document portion(s) processing engine 206 may then apply the identified ML selection model 212 to the generated structural representation of the electronic document. Application of the identified ML selection model 212 may result in generation of one or more hierarchical representations for one or more portions of the electronic document (such as, for example, portions 1210*a*, 1210*b*, 1210*c*, 1212*a*, 1212*b*, as shown in FIG. 12). In some embodiments, such portion(s) of the electronic document may be selected and/or identified by the document portion(s) processing engine 206 (such as, for example, using the identified ML selection model(s) 212, and/or in any other way) for generation of hierarchical representations.

In some embodiments, the document portion(s) processing engine 206 may generate hierarchical representations using one or more importance parameters that may be associated with element(s) in the electronic document. The importance parameters may be defined by a specific processing task. For example, as stated above, the processing task may request information related to and/or summary termination provisions of a sales contract. Thus, the document portion(s) processing engine 206 may determine that any (and/or some) provisions in the sales contract related to termination would be considered important.

Some importance parameters may be defined based on a content of at least one element in the electronic document. For example, "whereas" clauses appearing on the first page(s) of the sales contract may be determined to be important for the purposes of generating a summary of the document as they may define one or more pre-conditions for entry into the sales agreement by the parties to such agreement.

Alternatively, or in addition, importance parameters may be defined based on a type of the electronic document (e.g., a sales contract, a lease agreement, an application for employment, a computer program, etc.), a position of each element in the electronic document (e.g., first page, last page, etc.), a type of each element (e.g., a table, an image file, a text, etc.) in the electronic document, one or more functions of element(s) (e.g., a header, a section header, a sub-heading, etc.) in the electronic document, etc. As can be understood, any other type of factors and/or importance parameters may be used by the document portion(s) processing engine 206 to generate hierarchical representations of portions of the electronic document.

In some embodiments, the document summarization engine 124 may receive a request to execute at least one processing task (e.g., task 222) that may be related to the electronic document. The request may be received from the user device 214. The request may be sent in any desired form, e.g., via an email, an instant message, an audio file, a video file, a graphic, and/or in any other fashion. The document summarization engine 124, and in particular, its task processing engine 208 may receive the task 222 contained in the request from the user device 214. The task processing engine 208 may parse and/or analyze the task 222 to determine what the user would like to do (e.g., summarize sales agreement, summarize termination clauses of the sales agreement, etc.). The task processing engine 208 may also determine one or more importance factors that may be used for the purposes of selection of specific portions of the electronic document.

In some embodiments, the processing task 222 may include at least one of the following: a summarization of the electronic document, a summarization of at least one element in the document, a contextual extraction from the document, an explanation of the document, an explanation of at least one element in the document, an explanation of at least one portion of the document, a semantic search of the document, a generation of an outline of the document, and/or any other type of task and/or combinations of tasks. The user, using user device 214, may define specific parameters, criteria, etc. for the task 222, including how any responses may be presented. As discussed above, in some example, non-limiting, embodiments, the task processing engine 208's summarization operations may involve contextual extractions from the document (e.g., termination provisions of a sales agreement), e.g., one or more key-value pairs that may indicate and/or represent a summary of the document and/or any portion(s) thereof (e.g., term of the agreement is five years). Further, the task processing engine 208 may, for example, generate a simple explanation of the document (e.g., "this sales agreement outlines obligations of the buyer and the seller with respect to sale of commercial equipment") and/or any its portion(s) (e.g., "this agreement is subject to the laws of State of California"). Moreover, the task processing engine may execute a semantic search of the document and/or any portion(s) thereof (e.g., search for "term"). As is also discussed above, the task processing engine may extract portions of the document and summarize it in a simple form (e.g., abstractive summarization) and/or present such portion(s) as they appear in the document (e.g., extractive summarization). As can be understood, the task processing engine 208 may perform any other operations and/or tasks.

The task processing engine 208 may further collect the specific portions of the electronic document that may be needed for completion of the task 222 and generation of a response (e.g., by the summary generator 210). Once this information has been gathered, the task processing engine 208 may send it, optionally, along with the structural representation of the electronic document, to the generative AI model(s) 220 for generation of a response to the task 222. The generative AI model(s) 220 may be part of the engine 124 and/or be one or more third party models (e.g., ChatGPT, Bard, DALL-E, Midjourney, DeepMind, etc.) and may be accessed by the document summarization engine 124. The generative AI model(s) 220 may use the provided information to generate a response.

In some embodiments, the generative AI model(s) 220 may be provided with one or more portions of the electronic document for summarization. For example, the generative AI model(s) 220 may be asked to summarize termination provisions of the sales agreement (e.g., "this sales agreement will terminate in five years, unless terminated earlier due to material breach by the parties . . . "). Alternatively, or in addition, the generative AI model(s) 220 may be asked to extract one or more contextual values from one or more portions of the electronic document (e.g., one or more key-value pairs, etc.). Further, the generative AI model(s) 220 may be asked to perform processing related to a specific task 222. As can be understood, the task processing engine 208 may request the generative AI model(s) 220 to perform any desired processing and may identify and select specific information (e.g., portions of the electronic document, instructions to the generative AI model(s) 220, etc.) that it may provide to the generative AI model(s) 220 to perform such processing.

Once the generative AI model(s) 220 generated a response to the task 222, it may send the response to the document summarization engine 124, and in particular, to its summary generator 210. The summary generator 210 may assemble the information that may include the response from the generative AI model(s) 220 and provide it as output 216 for presentation on the graphical user interface of the user device 214. The output 216 may be presented in any desired form (e.g., as a text file, as an audio file, as an image, as a graphic, as a video file, etc.).

In some embodiment, the user may use the user device 214 to provide feedback 218 to the document summarization engine 124. The feedback 218 may be any type of feedback, such as, for example, a yes/no vote (e.g., thumbs up, thumbs down, etc.) that may be indicative of the user's acceptance of and/or satisfaction with the response to the task 222. The feedback 218 may be textual feedback that may include specific comments that may be written and sent to the document summarization engine 124 by the user using the user device 214. As can be understood, any other type of feedback may be provided.

The document summarization engine 124 may receive the user's feedback 218 (whether positive or negative or neutral) and use it for various purposes. For example, the document summarization engine 124 may update the structural representation of the electronic document and generate an update structural representation of the document (e.g., rearranging some elements in the tree-like structure, creating new groups of elements, etc.). The document summarization engine 124 may also identify at least another ML selection model(s) 212 for the purposes of generation of additional and/or further hierarchical representations of portions of the document. Such ML selection model(s) 212 may then be applied to one or more portions (whether previously identified and used and/or further portions) of the document to generate such further hierarchical representations. Further, the document summarization engine 124 may update the ML selection model(s) 212 identified for the document to generate an updated ML model 212 so that the updated ML model 212 may be applied to portions of the document to generate updated hierarchical representations for the portions of the document. Alternatively, or in addition, the document summarization engine 124 may just generate updated hierarchical representations for selected portions of the electronic document. As can be understood, any other actions may be performed by the document summarization engine 124 based on the user feedback 218. For example, the document summarization engine 124 may train, re-train, refresh-train and/or create new ML models 212.

Any of the above updates generated by the document summarization engine 124 may be provided to the generative AI model(s) 220 for generation of an updated response to the task 222 (and/or any other tasks). Once the updated response is generated by the generative AI model(s) 220, the summary generator 210 may generate an updated output 216 and provide it to the user device 214. The user may respond to the updated output 216 by either accepting it and/or providing further feedback 218. This process may continue until the user has no further feedback.

In some example embodiments, as discussed above, the feedback may be used to update, revise, modify, delete, change, and/or perform any other operations with regard to how prior operation(s) executed by one or more components of the document summarization engine 124 are and/or have been performed. For example, the feedback may be used to update the document structure generation engine 204, which may be responsible for generation of the structural representation of the document. Moreover, the feedback may be used to update one or more ML selection models 212 and/or how such models may be applied by the document portion(s) processing engine 206. Further, the feedback may also be used to update operations associated with specific task execution as performed by the task processing engine 208 as well as how summary generator 210 generates a summary for presentation to the user on the user device 214. Alternatively, or in addition, the feedback may be used to update, revise, modify, delete, change, and/or perform any other operations with specific output generated by any of the components of the engine 124. For example, as a result of the feedback, the structural representation of the electronic document may be updated. Further, new portions of the electronic document may be selected and/or identified based on the user feedback. As can be understood, any other updates, revisions, etc. to outputs may be executed. Further, any and/or all of these operations (e.g., updates, revisions, etc. to how operations are performed and to the output) may be performed simultaneously, one after the other, and/or in any other desired fashion. Additionally, the operations may be executed in real-time, as soon as feedback is received, and/or at any other desired time. In some example embodiments, the feedback may be fed back into one or more of the previous phases, and may be used to adjust and/or finetune, for example, how a document structure may be generated, how portions of document may be selected, how processing of specific tasks may be performed using the generative AI model, etc. For example, too many thumbs down on summaries of lengthy documents, may mean that criteria for selecting portions of document may need be adjusted to account for more important content, etc. User feedback may be used to update document tree-like structure, train and/or re-train and/or refresh train one or more models used for selection of portions of document to improve selection of portions of document, refine prompts submitted to the generative AI models, and/or for any other purpose(s).

Figure 3:
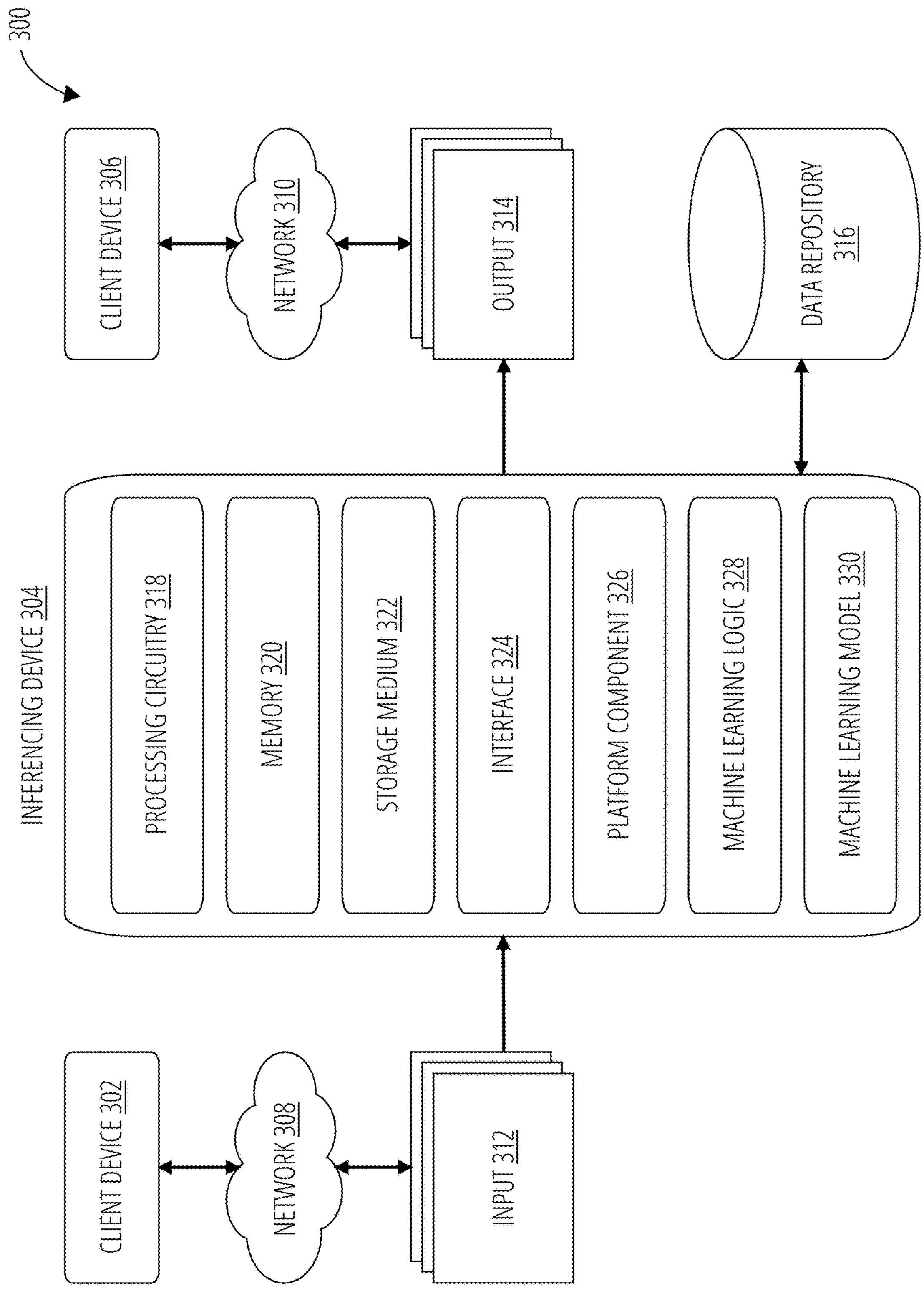
FIG. 3 illustrates an example of an AI/ML system that may be used for generating one or more transaction packages and/or guiding the user through one or more tasks, documents, etc., according to some embodiments of the current subject matter.

FIG. 3 illustrates an example of an AI/ML system 300 that may be used for generating one or more portions of an electronic document 202 based on a structure of the document, etc., according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 1900 as depicted in FIG. 19. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 2000 as depicted in FIG. 20. Embodiments are not limited to these examples.

The inferencing device 304 may include ML logic 328 and an ML model 330 to implement various AI/ML techniques for various AI/ML tasks. The ML logic 328 may receive the input 312, and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
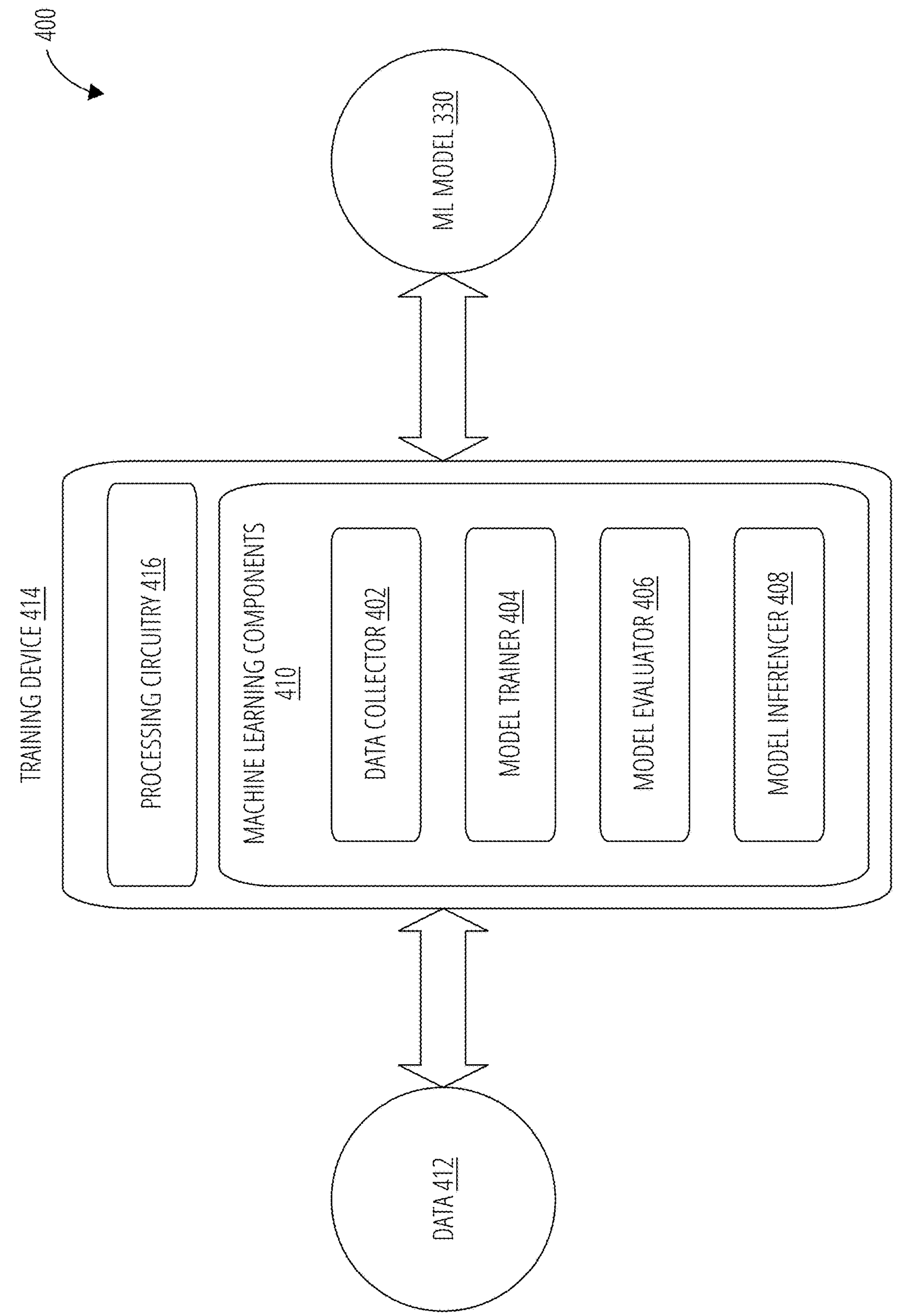
FIG. 4 illustrates an example apparatus that may include a training device suitable to generate a trained ML model for the inferencing device of the system shown in FIG. 3.

FIG. 4 illustrates an example apparatus 400 that may include a training device 414 suitable to generate a trained ML model 330 for the inferencing device 304 of the system 300. As shown in FIG. 4, the training device 414 may include a processing circuitry 416 and a set of ML components 410 to support various AI/ML techniques, such as a data collector 402, a model trainer 404, a model evaluator 406 and a model inferencer 408.

In general, the data collector 402 may collect data 412 from one or more data sources to use as training data for the ML model 330. The data collector 402 may collect different types of data 412, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 410 is described in more detail with reference to FIG. 5.

FIG. 5 illustrates an artificial intelligence architecture 500 that may be used by the training device 414 to generate the ML model 330 (e.g., ml selection model(s) 212, as shown in FIG. 2) for deployment by the inferencing device 304. The artificial intelligence architecture 500 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 as the trained ML model 330 in a production environment, and continuously monitor and maintain it.

The ML model 330 may be a mathematical construct used to predict outcomes based on a set of input data. The ML model 330 may be trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 may find the function for a given task. This function may even be able to produce the correct output for input that it has not seen during training. A data scientist prepares the mappings, selects and tunes the ML algorithm 524, and evaluates the resulting model performance. Once the ML logic 328 is sufficiently accurate on test data, it can be deployed for production use.

The ML algorithm 524 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, transformer-based algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable generating, processing, storing or managing data 504 suitable for a ML system. The data sources 502 may receive data 550 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 550 may also be supplied during training phase of the model. Some additional, non-limiting, examples of data sources 502 include without limitation databases, web scraping, sensors and Internet of Things (IOT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 an accessed via a network interface, or may be a combination of local and remote data sources 502.

The data sources 502 source difference types of data 504 (which may include data 550 related to documents, transactions, etc.). By way of example and not limitation, the data 504 includes structured data from relational databases, such as customer profiles, transaction histories, or product inventories. The data 504 includes unstructured data from websites such as customer reviews, news articles, social media posts, or product specifications. The data 504 includes data from temperature sensors, motion detectors, and smart home appliances. The data 504 includes image data from medical images, security footage, or satellite images. The data 504 includes audio data from speech recognition, music recognition, or call centers. The data 504 includes text data from emails, chat logs, customer feedback, news articles or social media posts. The data 504 includes publicly available datasets such as those from government agencies, academic institutions, or research organizations. These are just a few examples of the many sources of data that can be used for ML systems. It is important to note that the quality and quantity of the data is critical for the success of a machine learning project.

The data 504 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 may gather relevant data 504 from the data sources 502. Once collected, the data collector 402 may use a pre-processor 506 to make the data 504 suitable for analysis. This may involve data cleaning, transformation, and feature engineering. Data preprocessing is a critical step in ML as it directly impacts the accuracy and effectiveness of the ML model 330. The pre-processor 506 receives the data 504 as input, processes the data 504, and outputs pre-processed data 516 for storage in a database 508. Examples for the database 508 includes a hard drive, solid state storage, and/or random access memory (RAM).

The data collector 402 is communicatively coupled to a model trainer 404. The model trainer 404 may perform AI/ML model training, validation, and testing which may generate model performance metrics as part of the model testing procedure. The model trainer 404 may receive the pre-processed data 516 as input 510 or via the database 508. The model trainer 404 may implement a suitable ML algorithm 524 to train an ML model 330 on a set of training data 526 from the pre-processed data 516. The training process may involve feeding the pre-processed data 516 into the ML algorithm 524 to produce or optimize an ML model 330. The training process may adjust its parameters until it achieves an initial level of satisfactory performance.

The model trainer 404 may be communicatively coupled to a model evaluator 406. After an ML model 330 is trained, the ML model 330 may need to be evaluated to assess its performance. This is done using various metrics such as accuracy, precision, recall, and F1 score. The model trainer 404 may output the ML model 330, which is received as input 510 or from the database 508. The model evaluator 406 may receive the ML model 330 as input 512, and it initiates an evaluation process to measure performance of the ML model 330. The evaluation process may include providing feedback 518 to the model trainer 404. The model trainer 404 may re-train the ML model 330 to improve performance in an iterative manner.

The model evaluator 406 may be communicatively coupled to the model inferencer 408. The model inferencer 408 may provide AI/ML model inference output (e.g., inferences, predictions or decisions). Once the ML model 330 is trained and evaluated, it may be deployed in a production environment where it is used to make predictions on new data. The model inferencer 408 may receive the evaluated ML model 330 as input 514. The model inferencer 408 may use the evaluated ML model 330 to produce insights or predictions on real data, which may be deployed as a final production ML model 330. The inference output of the ML model 330 may be use case specific. The model inferencer 408 may also perform model monitoring and maintenance, which involves continuously monitoring performance of the ML model 330 in the production environment and making any necessary updates or modifications to maintain its accuracy and effectiveness. The model inferencer 408 may provide feedback 520 to the data collector 402 to train or re-train the ML model 330. The feedback 518 may include model performance feedback information, which may be used for monitoring and improving performance of the ML model 330.

Some or all of the model inferencer 408 may be implemented by various actors 522 in the artificial intelligence architecture 500, including the ML model 330 of the inferencing device 304, for example. The actors 522 may use the deployed ML model 330 on new data to make inferences or predictions for a given task, and output an insight 532. The actors 522 may implement the model inferencer 408 locally, or remotely receives outputs from the model inferencer 408 in a distributed computing manner. The actors 522 may trigger actions directed to other entities or to itself. The actors 522 provide feedback 520 to the data collector 402 via the model inferencer 408. The feedback 520 may include data needed to derive training data, inference data or to monitor the performance of the ML model 330 and its impact to the network through updating of key performance indicators (KPIs) and performance counters.

As discussed above, the systems 100, 300 implement some or all of the artificial intelligence architecture 500 to support various use cases and solutions for various AI/ML tasks. In some embodiments, the training device 414 of the apparatus 400 may use the artificial intelligence architecture 500 to generate and train the ML model 330 for use by the inferencing device 304 for the system 100. In one embodiment, for example, the training device 414 may train the ML model 330 as a neural network, as described in more detail with reference to FIG. 6. Other use cases and solutions for AI/ML are possible as well, and embodiments are not limited in this context.

Figure 6:
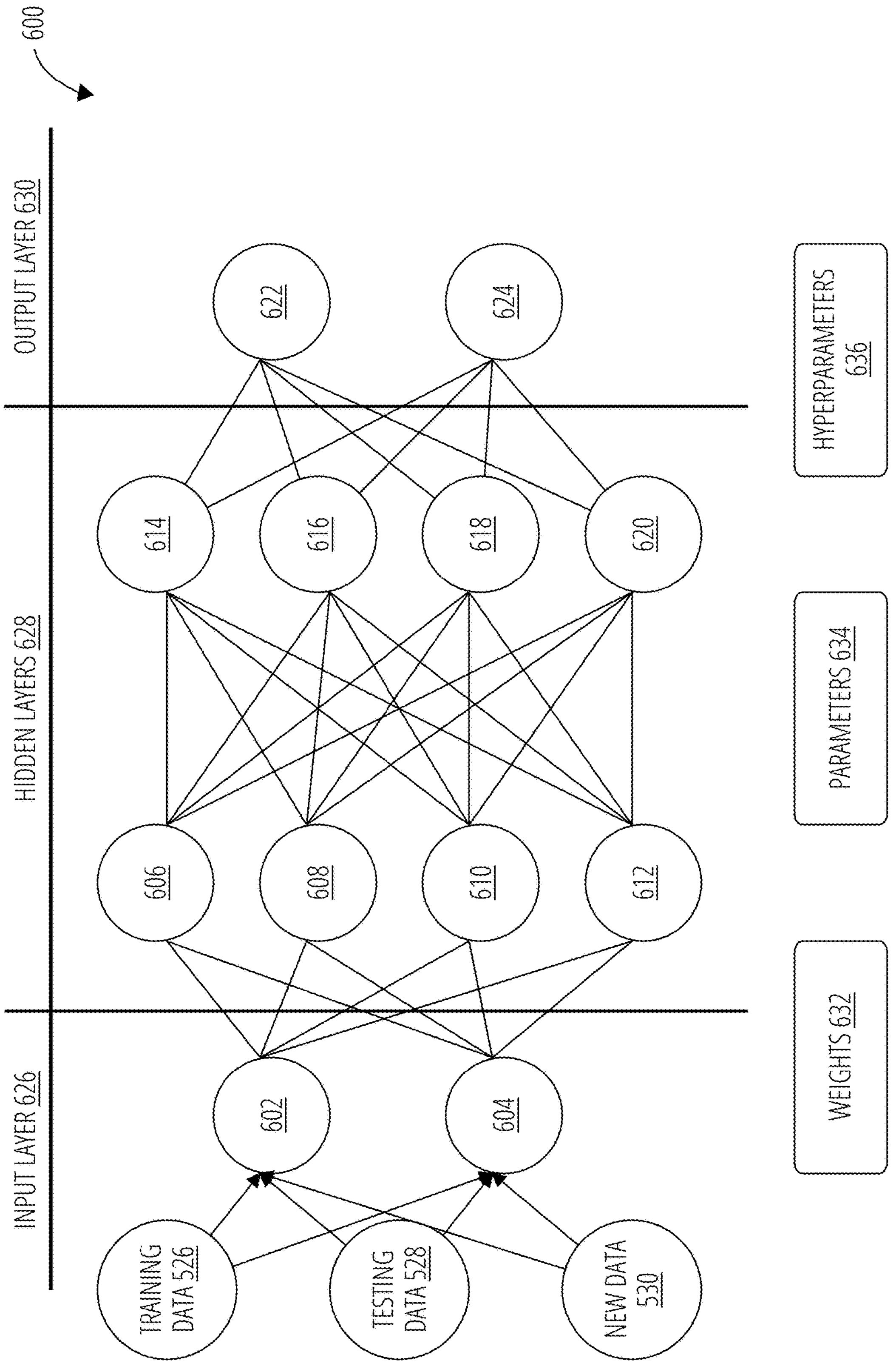
FIG. 6 illustrates an artificial neural network in accordance with one embodiment.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 may include multiple node layers, containing an input layer 626, one or more hidden layers 628, and an output layer 630. Each layer comprises one or more nodes, such as nodes 602 to 624. As shown in FIG. 6, for example, the input layer 626 may include nodes 602, 604. The artificial neural network 600 may include two hidden layers 628, with a first hidden layer having nodes 606, 608, 610 and 612, and a second hidden layer having nodes 614, 616, 618 and 620. The artificial neural network 600 may include an output layer 630 with nodes 622, 624. Each node 602 to 624 may include a processing element (PE), or artificial neuron, that connects to another and has an associated weight and threshold. If the output of any individual node is above the specified threshold value, that node may be activated, sending data to the next layer of the network. Otherwise, no data is passed along to the next layer of the network.

In general, artificial neural network 600 may rely on training data 526 to learn and improve accuracy over time. However, once the artificial neural network 600 may be fine-tuned for accuracy, and tested on testing data 528, the artificial neural network 600 may be ready to classify and cluster new data 530 at a high velocity. Tasks in speech recognition or image recognition can take minutes versus hours when compared to the manual identification by human experts.

Each individual node 602 to 424 may be a linear regression model, composed of input data, weights, a bias (or threshold), and an output. The linear regression model may have a formula similar to Equation (1), as follows:

$$\Sigma wixi+bias=w1x1+w2x2+w3x3+bias \quad \text{EQUATION (1)}$$

$$output=f(x)=1 \text{ if } \Sigma w1x1+b>=0;\ 0 \text{ if } \Sigma w1x1+b<0$$

Once an input layer 626 is determined, a set of weights 632 may be assigned. The weights 632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In some embodiments, the artificial neural network 600 may leverage sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. In one embodiment, the artificial neural network 600 uses backpropagation. Backpropagation is when the artificial neural network 600 moves in the opposite direction from output to input. Backpropagation allows calculation and attribution of errors associated with each neuron 602 to 624, thereby allowing adjustment to fit the parameters 634 of the ML model 330 appropriately.

The artificial neural network 600 is implemented as different neural networks depending on a given task. Neural networks are classified into different types, which are used for different purposes. In one embodiment, the artificial neural network 600 is implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. In one embodiment, the artificial neural network 600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 is implemented as any type of neural network suitable for a given operational task of system 100, and the MLP, CNN, and RNN are merely a few examples. Embodiments are not limited in this context.

The artificial neural network 600 may include a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 600 may be implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 7 illustrates an example of a document corpus 708 suitable for use by the document summarization engine 124 of the server device 102. The document corpus 708 may be stored in one or more database and/or storage locations and may be accessible (e.g., via a query) by the document summarization engine 124. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 138 stored in the data store 126. The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 during a document generation process. In one embodiment, the sets and subsets of electronic documents 718 may be unlabeled.

Figure 8:
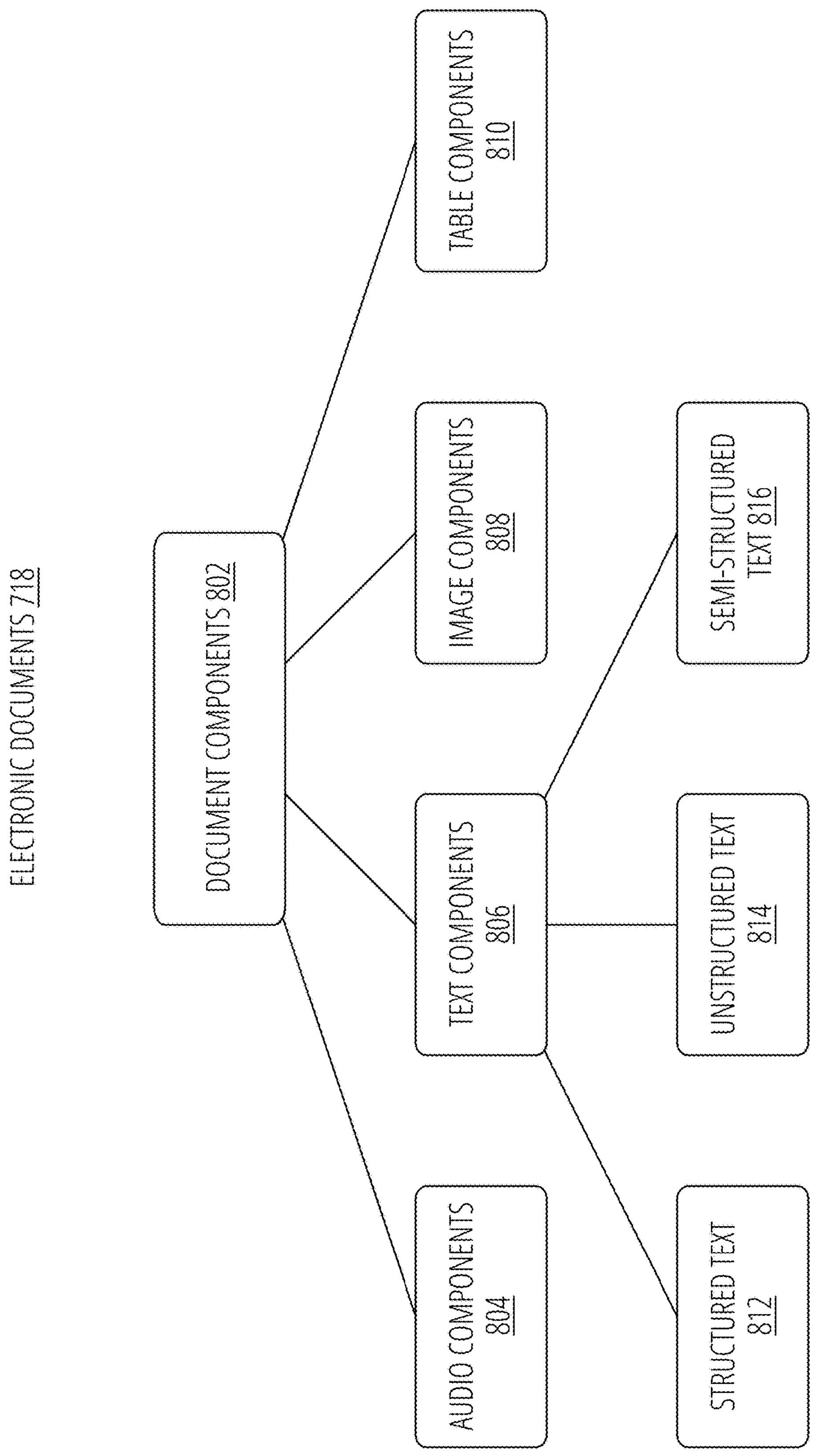
FIG. 8 illustrates electronic documents in accordance with one embodiment.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
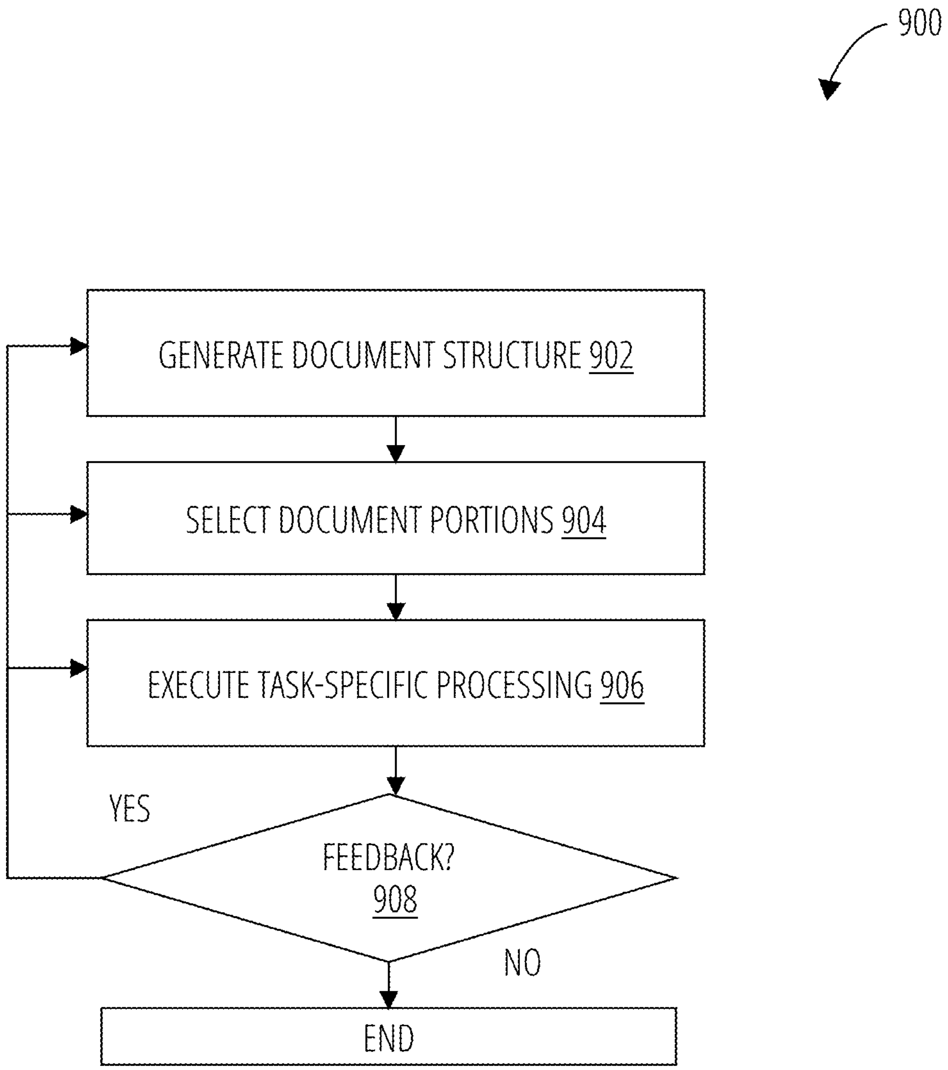
FIG. 9 illustrates an example process for executing summarization of an electronic document, according to some embodiments of the current subject matter.

FIG. 9 illustrates an example process 900 for executing summarization of an electronic document, according to some embodiments of the current subject matter. The process 900 may be executed using the document summarization engine 124 shown in FIGS. 1-2. At 902, the document summarization engine 124 may be configured to generate (and/or alternatively, receive) a structural representation or document structure of an electronic document.

FIG. 10 illustrates an example of such structural representation or document structure 1004 of an electronic document 1002. As discussed above, in some example, non-limiting embodiments, the document structure 1004 may include an arrangement of elements of the document in a tree-like and/or hierarchical order. As can be understood, the elements in the structural representation may be arranged in any desired way.

As shown in FIG. 10, the electronic document 1002 may be configured to include one or more pages (e.g., a sales contract with several hundred pages). Each page may include one or more of the following various headings, sub-headings, paragraphs, tables, images, etc. In some embodiments, documents may include electronic files (e.g., audio, video, text, graphics, images, computer code, etc.). Such electronic files may be embedded into the document, linked to the document (e.g., using HTML links), and/or otherwise associated with the document.

The document structure generation engine 204 of the document summarization engine 124 may be configured to analyze and parse the electronic document 1002 to extract one or more of its elements (e.g., headings, sub-headings, sections, paragraphs, sentences, tables, images, etc.). The document structure generation engine 204 may also be configured to determine one or more relationships between elements of the document. The elements' relationships may correspond to specific structural arrangement of elements within the structural representation 1004 (e.g., previous level to next level; etc.)

The structural representation 1004 may include a document 1006 as a root element and sections 1, 2, 3 1008*a*, 1008*b*, 1008*c* as next level elements. Each section may include its own next level elements. For instance, section 1008*a* may include a heading 1 element 1010 and paragraph 1 element 1012. Each of these may correspond to specific elements in the electronic document 1002 (e.g., heading 1 element 1010 may be "termination" and paragraph 1 element 1012 may be "term"). Further, paragraph 1 element 1012 may include its own next level elements, e.g., sentences 1, 2, 3 1014*a*, 1014*b*, 1014*c*. For example, sentence 1 element 1014*a* may correspond to "The term of this agreement is five years from the date of the agreement"; sentence 2 element 1014*b* may correspond to "The term is automatically renewable for another five years, unless agreement is terminated by the parties"; and sentence 3 element 1014*c* may correspond to "In no event, the term of this agreement may exceed ten years." Section elements 1008*b* and 1008*c* may have their own element structures, e.g., section element 1008*b* may include a sub-heading 2 element and paragraphs 2, 3, 4; and section element 1008*c* may, among other elements, may include a Table 1 element 1016 and an Image 1 element 1018. As can be understood, any other examples of elements are possible.

Figure 11:
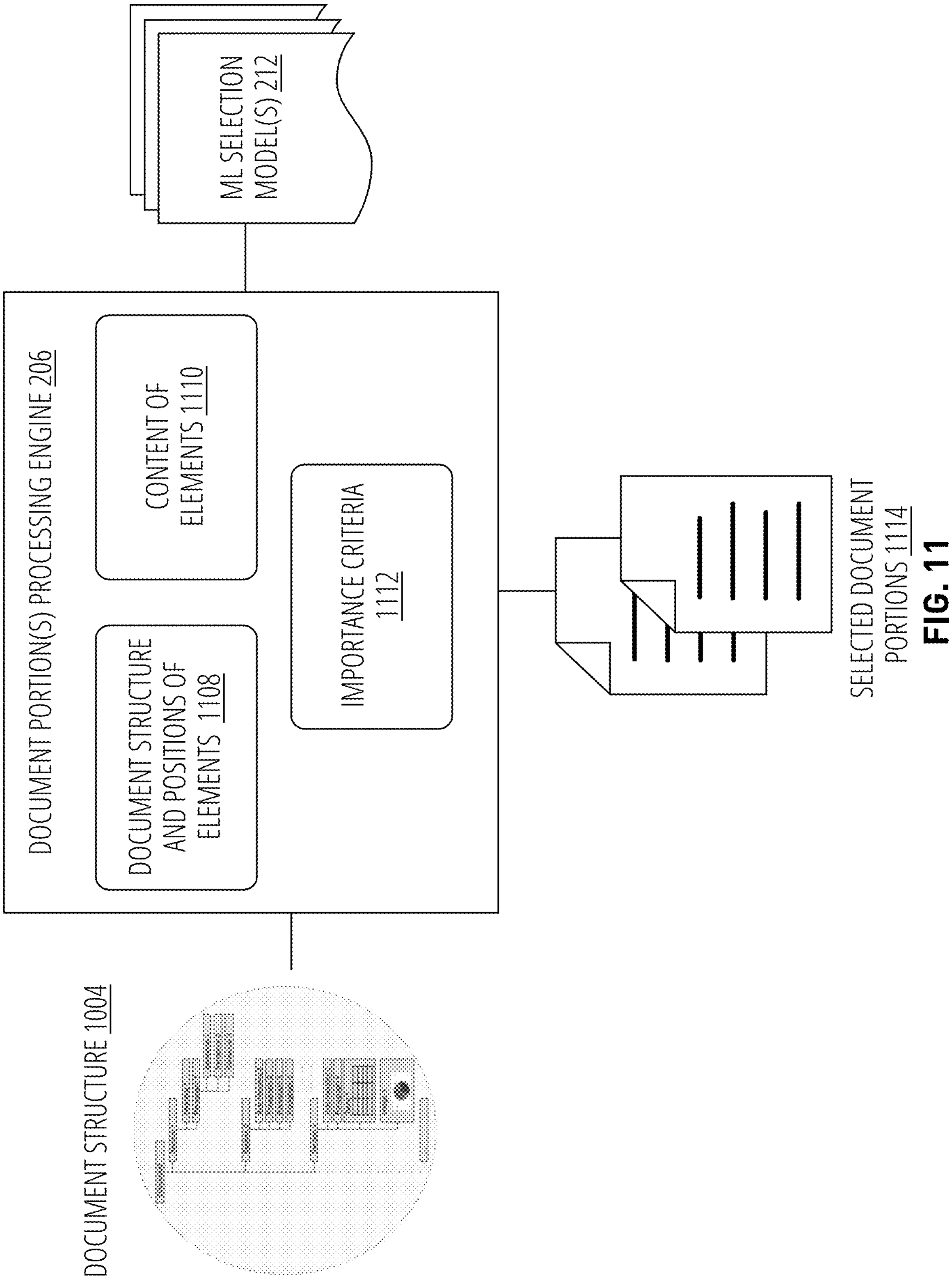
FIG. 11 illustrates an example operation of the document portion(s) processing engine, according to some embodiments of the current subject matter.

Referring back to FIG. 9, once the structural representation of the document is generated (and/or received), the document portion(s) processing engine 206 of the document summarization engine 124 may be configured to execute selection of portion(s) of the electronic document, at 904. FIG. 11 illustrates an example operation of the document portion(s) processing engine 206, according to some embodiments of the current subject matter. The document portion(s) processing engine 206 may be configured to receive the document structure 1004 from the document structure generation engine 204 and generate one or more selected document portions 1114. The selected document portions 1114 may be generated based on the document structure and positions of elements 1108, content of elements 1110, and/or importance criteria 1112.

The document structure and positions of elements 1108 may be determined based on the structural representation 1004. In some embodiments, for the purposes of identifying specific portions of the document (e.g., to respond to a particular processing task), the engine 206 may be configured to identify one or more important elements, where such elements may be identified based on their specific content as it relates to the processing task (e.g., a processing task seeking a summary of termination provisions of a sales agreement may trigger a determination that termination conditions in the termination clause of the agreement are important elements). Further, the engine 206 may also consider position of the elements in the structural representation of the document. For example, "whereas" clause of an agreement appearing in the first few pages of the agreement may be considered to be important for document summarization purposes. Alternatively, or in addition, specific context of the document and its elements may affect how engine 206 may select specific portions of the document. For instance, a sales agreement's pricing terms may be considered as more important than some of the other sections of the agreement.

To ascertain which elements may be important and/or important for the purposes of providing a response to a particular processing task, the document portion(s) processing engine 206 may be configured to identify and access one or more ML selection model(s) 212. The ML selection model(s) 212 may be associated with a particular type of documents (e.g., sales agreement, lease agreement, employment application, government contract, computer program, etc.), a particular subject (e.g., termination clauses, pricing terms, executable functions in a computer code, etc.) that may be identified in the processing task 222, a specific processing task 222, and/or any other types. The models may be trained using various historical data related to the electronic documents. The training may rely on labeled data (e.g., a document having each element associated with a particular identifier or label), semi-labeled data, and/or unlabeled data. Moreover, the models may be re-trained and/or refresh trained based on feedback that may be received from users.

Once a particular ML selection model(s) 212 has been identified by the document portion(s) processing engine 206, the engine 206 may apply the identified model to the structural representation of the document. Along with the structural representation (e.g., document structure and positions of elements 1108), the engine 206 may also provide content of elements 1110, importance criteria 1112, and/or any other data as input to the identified ML selection model(s) 212. Application of the identified ML selection model(s) 212 to the above data may result in generation of one or more selected document portions 1114.

The selected document portions 1114 may be selected based on an importance parameter associated with at least one element in the document, the processing task, a content of at least one element in the document, and/or any other factors, and/or any combinations thereof. Selected document portions 1114 may be outputted by the engine 206 accordingly.

FIG. 12 illustrates examples of such output by the engine 206 (after application of the selected ML selection model(s) 212), according to some embodiments of the current subject matter. The output may include selected portions 1208*a*, 1208*b*, and 1208*c* of the document. The selected portions 1208*a* may correspond to portions of the document (e.g., termination provisions, pricing tables, etc. of a sales agreement) that may be selected for summarization. For example, the portion 1208*a* may identify heading 1 1210*a* under section 1 of the document, sentences 2 1210*b* under paragraph 1 in section 1 of the document, and sub-heading 2 and paragraph 2 1210*c* under section 2 of the document, as being selected for summarization. These elements may have been selected based on, for example, a type of the document, a position of each of these elements in the document, a type of each of these elements, one or more functions associated with one or more of these elements, and/or any other reasons, and/or any combinations of reasons.

Portions 1208*b* may identify sub-heading 2 and paragraphs 2 and 3 1212*a* under section 2 as well as Table 1 1212*b* under section 3 as being selected. These portions may have been selected for the purposes of contextual extractions. For example, in a sales agreement, it may be important to know pricing terms, which may be listed in Table 1 1212*b* and as such, these terms may need to be extracted from Table 1 1212*b*. Again, any of the contextual extraction elements may be selected in accordance with the type of the document, positions of elements, types of elements, functions associated with elements, and/or any other reasons, and/or any combinations of reasons.

Moreover, portions 1208*c* may be selected in accordance with the specific processing task 222, For example, the task 222 may request information related to the law of jurisdiction (e.g., California) where a particular agreement is to be enforced. The engine 206 may identify and apply a specific ML selection model(s) 212 that may be used to identify provisions related to the law.

As can be understood, a single or multiple ML selection model(s) 212 may be used for one or multiple processing tasks to identify particular portions of documents for different purposes. Further, use of specific importance parameters may also be dependent and/or defined by a variety of factors, such as, for example, the processing task, the type of the document, positions of elements in the document, types of elements, functions of elements, etc. In some embodiments, the engine 206 may be configured to generate selected document portions as subtrees of the structural representation of the document (as, for example, is shown in FIG. 12). The subtrees may be represented using tags, links, vectors (e.g., multi-class vectors, etc.), and/or in any other fashion.

Figure 13:
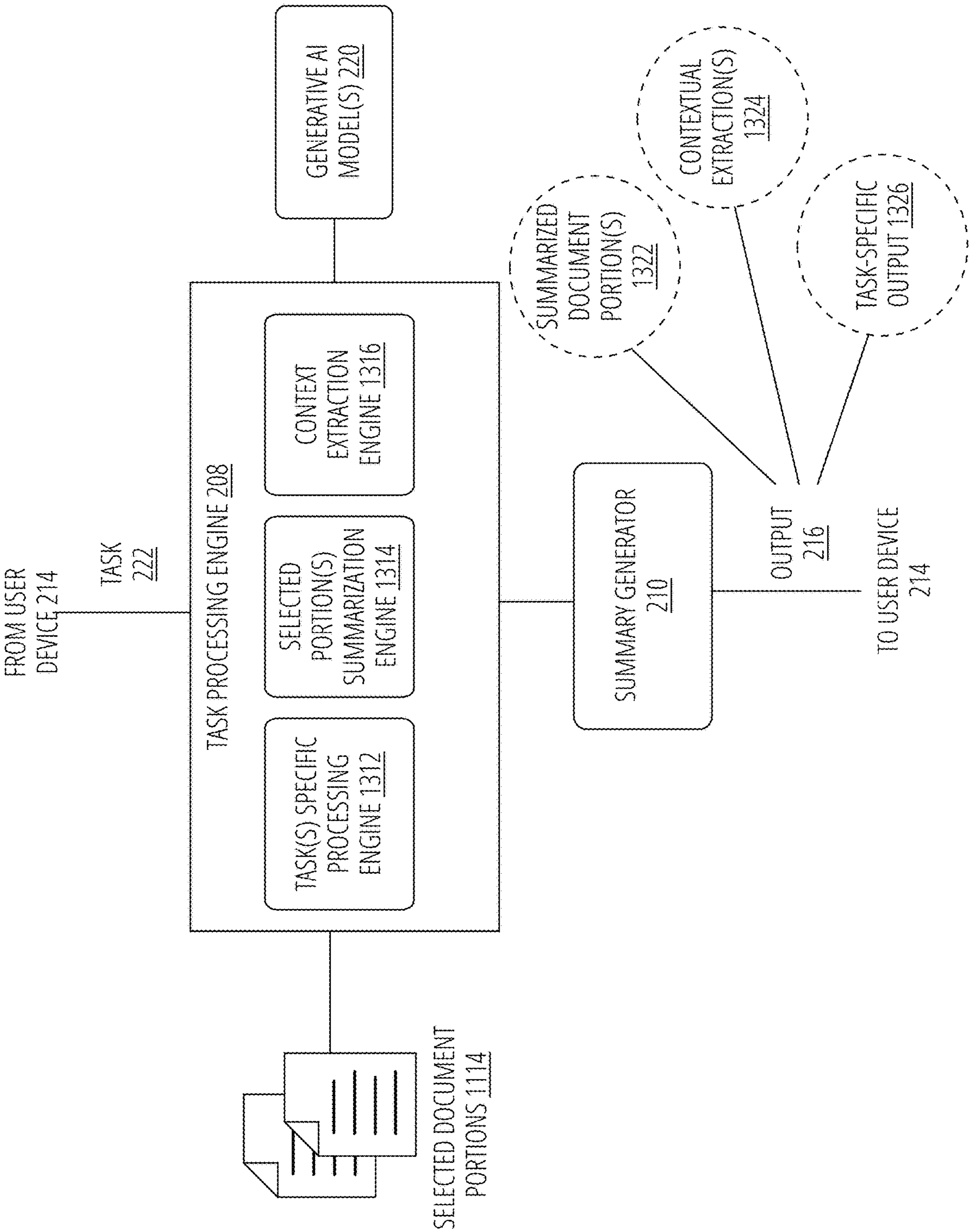
FIG. 13 illustrates an example operation of the task processing engine, according to some embodiments of the current subject matter.

Referring back to FIG. 9, the document summarization engine 124, and in particular its task processing engine 208, may be configured to execute a task specific processing as related to the electronic document, at 906. FIG. 13 illustrates an example operation of the task processing engine 208, according to some embodiments of the current subject matter. The task processing engine 208 may include a task(s) specific processing engine 1312, selected portion(s) summarization engine 1314, and a context extraction engine 1316.

As input, the task processing engine 208 may be configured to receive specific processing task 222 from the user device 214 (e.g., summarize termination clauses in the sales agreement, summarize lease agreement, etc.) and selected document portions 1114 from the document portion(s) processing engine 206.

The task(s) specific processing engine 1312 may be configured to perform processing operations that may be related to the specific processing task 222 received from the user device 214. For example, the task 222 may request performing a query for a semantic search of the electronic document, generate an explanation of particular portion(s) of the document and/or the entire document. The task(s) specific processing engine 1312 may be configured to access one or more generative AI model(s) 220 to obtain a response to the task. Along with the specifics of the task, the task(s) specific processing engine 1312 may provide selected document portions 1114 that may have been identified as related to the received task 222. The generative AI model(s) 220 may be configured to generate the response, which may include a task-specific output, such as for example, generation of a summary of a document, a document outline for a document outline generation task (e.g., an outline with links that may be clicked to reveal various information).

Once the response from the generative AI model(s) 220 is received by the task processing engine 208, it may be provided to the summary generator 210. The summary generator 210 may be configured to generate an output 216 for presentation on a graphical user interface of the user device 214. The output 216 may include a task-specific output 1326 (e.g., a summary of the document, etc.). The task-specific output 1326 may then be sent to the user device 214.

The selected portion(s) summarization engine 1314 may be configured to receive selected document portions 1114 and provide them to the generative AI model(s) 220 to generate, for example, a summary of one or more or all such selected portions. The engine 1314 may provide such portions to the generative AI model(s) 220 in response to receiving the task 222 and/or without being prompted by such task. The generative AI model(s) 220 using the content of the selected document portions 1114 that may, for example, summarize all termination provisions of a sales agreement (e.g., "The term of this agreement is five years. The term is automatically extendible by another five years, unless agreement is terminated by a party. In no event, the term of the agreement may exceed 10 years.").

The response generated by the generative AI model(s) 220 may then be sent back to the task processing engine 208, whereby the summary generator 210 may generate the output 216 for presentation on the graphical user interface of the user device 214. In this instance, the output 216 may include a summarized document portion(s) 1322 (e.g., a summary of the termination provisions, etc.). The summarized document portion(s) 1322 may then be sent to the user device 214.

Further, the context extraction engine 1316 may request the generative AI model(s) 220 to extract content from one or more selected portions of the electronic document. Again, the context extraction engine 1316 may request the generative AI model(s) 220 to perform context extraction in response to receiving the task 222 and/or without being prompted by such task. The generative AI model(s) 220 using the content of the selected document portions 1114 that may, for example, extract specific payment schedule and corresponding payment amounts from a table contained in the selected document portions 1114. The summary generator 210, upon receiving response generated by the generative AI model(s) 220 from the task processing engine 208, may generate contextual extraction(s) 1324 as part of the output 216 and send it for presentation on the user device 214.

Referring back to FIG. 9, the user, upon receiving the output 216, may, using the user device 214, provide feedback 218, at 908. If the user provides feedback 218, it may be sent to the document summarization engine 124. The engine 124 may determine how and/or whether to apply the received feedback to update structural representation of the document, update (and/or select another) ML selection model(s) 212 for generation of one or more document portions by the document portion(s) processing engine 206, update (and/or execute) processing of the task 222, provided updated instructions to the generative AI model(s) 220 in connection with the task 222, and/or perform any other operations. The feedback 218 may be binary (e.g., "thumbs up", "thumbs down", etc.), contextual (e.g., specific comment on the summary of a document), and/or any other type of feedback.

The feedback process may continue until the user has no more feedback. Alternatively, or in addition, the feedback process may be stopped by the document summarization engine 124 after a certain number of iterations in the feedback process. For example, the document summarization engine 124 may prevent the user from providing further feedback after two times, at which point, the engine 124 may determine that an error may have occurred during one or more of the operations 902-906 and advise the user to defer further feedback until such error is corrected by the engine 124.

FIG. 14 illustrates an example process 1400 for executing a summarization of an electronic document, according to some embodiments of the current subject matter. The process 1400 may be executed by the system 100, as shown in FIG. 1 and in particular using document summarization engine 124, as shown in FIG. 2.

At 1402, document summarization engine may generate a structural representation of an electronic document. The structural representation may specify one or more elements of the electronic document and one or more relationships between the one or more elements of the electronic document. FIG. 10 illustrates example structural representation 1004 and may include various elements (e.g., headings, sub-headings, sections, paragraphs, tables, images, etc.) that may be arranged in a tree-like structure and/or in any other desired way (e.g., simple graphs, directed graphs, undirected graphs, weighted graphs, adjacency matrices, adjacency lists, adjacency sets, etc.). In some embodiments, the structural representation may include a hierarchical arrangement of elements of the electronic document based on one or more relationships between such elements. Further, the elements may be grouped together in one or more groups.

At 1404, document summarization engine 124 may identify a machine learning model for the electronic document. The machine learning model may be identified and/or selected from ML selection model(s) 212. Such models may be trained using historical data as well as user's feedback 218. The engine 124 may then apply the selected ML model using the structural representation of the document, to one or more portions of the document to generate a hierarchical representation for each of or one or more portions of the document.

At 1406, the document summarization engine 124 may receive a request to execute at least one processing task (e.g., task 222) related to the document (e.g., summarize document, summarize a specific portion of the document, extract content, perform search query, etc.). To generate the response to the task 222, the document summarization engine 124 may send at least one generated hierarchical representation of at least one portion of the document to the generative AI model(s) 220. The generative AI model(s) 220 may be configured to execute the processing task based on the received information and generate a response to the request, at 1408. Once response is received, at 1410, the document summarization engine 124 may present the response on a graphical user interface of the user computing device (e.g., user device 214).

Figure 15:
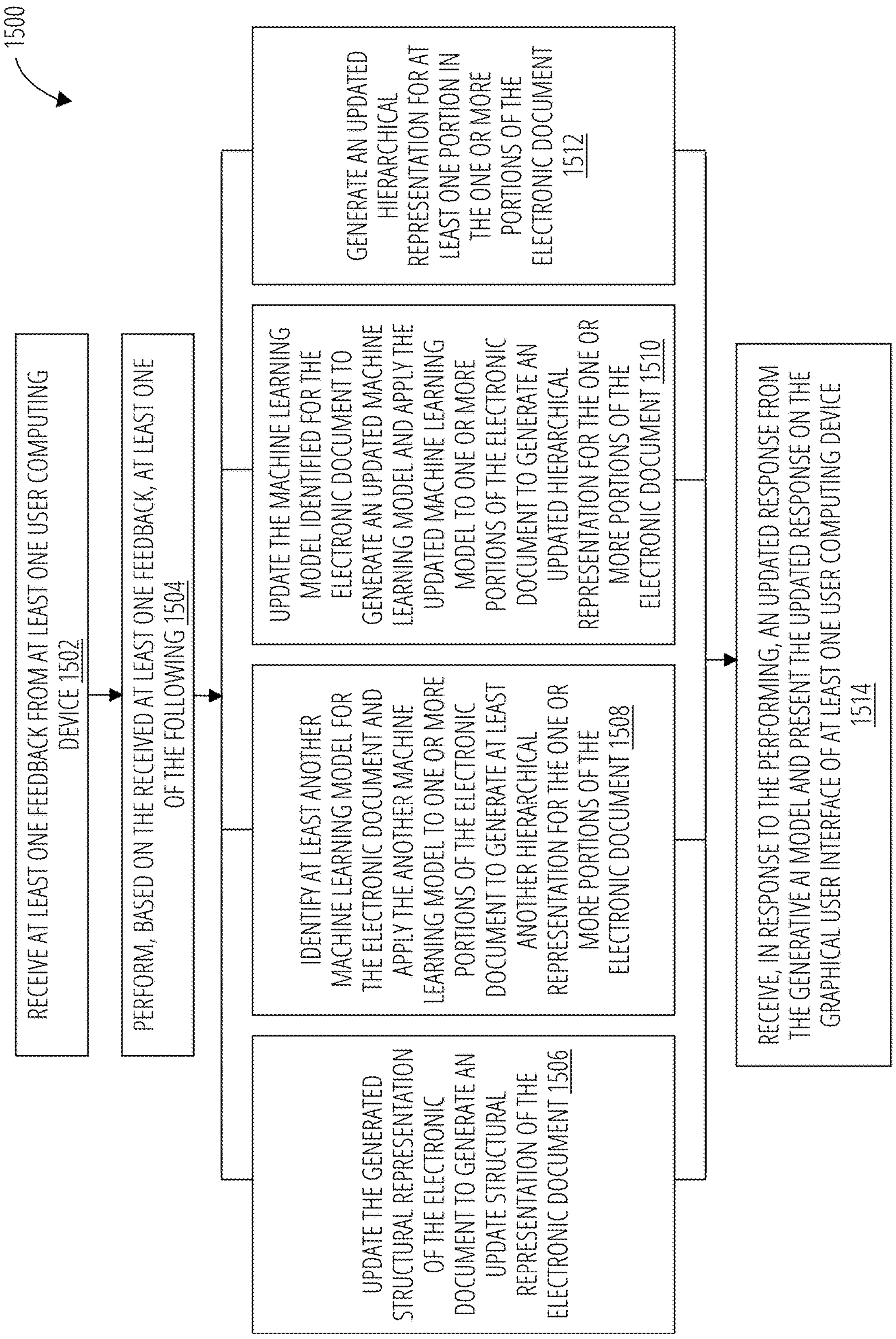
FIG. 15 illustrates an example process for providing feedback in response to executing a summarization of an electronic document, according to some embodiments of the current subject matter.

In some embodiments, as shown in FIG. 15, the document summarization engine 124 may receive a feedback 218 to the response, presented to the user, from the user device 214, at 1502. The engine 124 may then determine to perform one or more operations 1506-1512, at 1504, based on the received feedback. At 1506, the engine 124 may determine to update the generated structural representation of the document and generate an update structural representation of the document. Alternatively, or in addition, at 1508, the engine 124 may identify at least another machine learning model (e.g., ML selection model(s) 212) for the document and apply such ML model to one or more portions of the document to generate another hierarchical representation for each of and/or one or more portions of the document. The engine 123 may also update the ML selection model(s) 212 that was previously identified for the document and generate an updated ML selection model(s) 212. The updated model may then be applied to one or more portions of the document to generate an updated hierarchical representation for each and/or one or more portions of the document, at 1510. Moreover, the engine 124 may generate an updated hierarchical representation for at least one portion of the document. As can be understood, any combination of these operation and/or other operations may be performed by the engine 124 in response to the feedback 218. At 1514, the engine 124 may also receive, in response to the above operations, an updated response from the generative AI model(s) 220 and present the updated response on the graphical user interface of the user device 214.

FIG. 16 illustrates another example process 1600 for executing a summarization of an electronic document, according to some embodiments of the current subject matter. The process 1600 may also be executed by the system 100, as shown in FIG. 1 and in particular using document summarization engine 124, as shown in FIG. 2.

At 1602, the document summarization engine 124 may identify a machine learning model (e.g., ML selection model(s) 212) for an electronic document. The engine 124 may then apply the model, based on a structural representation of the electronic document (e.g., structural representation 1004 as shown in FIG. 10, to one or more portions of the electronic document to generate a hierarchical representation (e.g., representations 1208*a*, 1208*b*, 1208*c* as shown in FIG. 12) for one or more portions of the electronic document. As discussed above, the structural representation of the electronic document specifies one or more elements of the electronic document and one or more relationships between one or more elements of the electronic document. At 1604, the engine 124 may send, in response to receiving a request to execute at least one processing task (e.g., task 222) related to the document, at least one generated hierarchical representation of at least one portion of the document to a generative artificial intelligence (AI) model (e.g., generative AI model(s) 220) to execute the processing task by generating a response to the request. At 1606, the engine 124 may present the response on a graphical user interface of at least one user computing device (e.g., user device 214).

FIG. 17 illustrates yet another example process 1700 for executing a summarization of an electronic document, according to some embodiments of the current subject matter. The process 1700 may likewise be executed by the system 100, as shown in FIG. 1 and in particular using document summarization engine 124, as shown in FIG. 2.

At 1702, the engine 124 may receive a request to execute at least one processing task (e.g., task 222) related to an electronic document (e.g., document 1002 as shown in FIG. 10). The engine 124 may then send a hierarchical representation of at least one portion of the electronic document to a generative artificial intelligence (AI) model (e.g., generative AI model(s) 220) to execute the processing task by generating a response to the request, at 1704. The hierarchical representation (e.g., representations 1208*a*, 1208*b*, 1208*c* as shown in FIG. 12) may be generated by applying a machine learning model (e.g., ML selection model(s) 212) to one or more portions of the document. The ML model may be selected by the engine 124 based on a structural representation (e.g., representation 1004 as shown in FIG. 10) of the electronic document. The structural representation may specify one or more elements (e.g., headings, sections, paragraphs, sentences, tables, images, etc.) of the electronic document and one or more relationships (e.g., section-paragraph, paragraph-sentence, etc.) between the elements of the document. At 1706, the engine 124 may present the response (e.g., generated by the summary generator 210 based on the output 216) on a graphical user interface of at least one user computing device (e.g., user device 214). At 1708, the engine 124 may receive at least one feedback (e.g., feedback 218) from the user device 214 in response to the received response, causing it to generate an updated response by the generative AI model for presentation on the user device 214.

Figure 18:
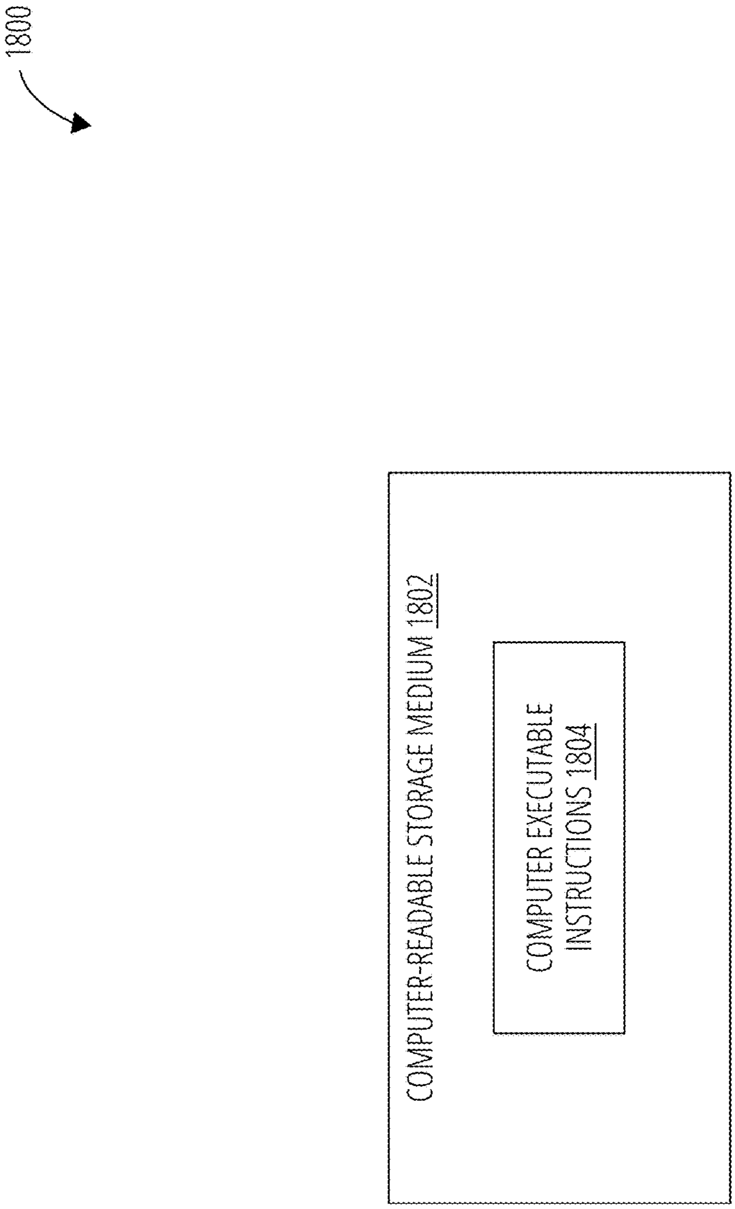
FIG. 18 illustrates a computer-readable storage medium in accordance with one embodiment.

FIG. 18 illustrates an apparatus 1800. Apparatus 1800 may comprise any non-transitory computer-readable storage medium 1802 or machine-readable storage medium, such as an optical, magnetic or semiconductor storage medium. In various embodiments, apparatus 1800 may comprise an article of manufacture or a product. In some embodiments, the computer-readable storage medium 1802 may store computer executable instructions with which circuitry can execute. For example, computer executable instructions 1804 can include instructions to implement operations described with respect to any logic flows described herein. Examples of computer-readable storage medium 1802 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1804 may include any suitable type of code, such as source code, compiled code, interpreted code, executable code, static code, dynamic code, object-oriented code, visual code, and the like.

FIG. 19 illustrates an embodiment of a computing architecture 1900. Computing architecture 1900 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1900 may have a single processor with one core or more than one processor. Note that the term “processor” refers to a processor with a single core or a processor package with multiple processor cores. In at least one embodiment, the computing architecture 1900 is representative of the components of the system 100. More generally, the computing architecture 1900 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 19, computing architecture 1900 comprises a system-on-chip (SoC) 1902 for mounting platform components. System-on-chip (SoC) 1902 is a point-to-point (P2P) interconnect platform that includes a first processor 1904 and a second processor 1906 coupled via a point-to-point interconnect 1970 such as an Ultra Path Interconnect (UPI). In other embodiments, the computing architecture 1900 may be of another bus architecture, such as a multi-drop bus. Furthermore, each of processor 1904 and processor 1906 may be processor packages with multiple processor cores including core(s) 1908 and core(s) 1910, respectively. While the computing architecture 1900 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1904 and chipset 1932. Some platforms may include additional components and some platforms may only include sockets to mount the processors and/or the chipset. Furthermore, some platforms may not have sockets (e.g., SoC, or the like). Although depicted as a SoC 1902, one or more of the components of the SoC 1902 may also be included in a single die package, a multi-chip module (MCM), a multi-die package, a chiplet, a bridge, and/or an interposer. Therefore, embodiments are not limited to a SoC.

The processor 1904 and processor 1906 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1904 and/or processor 1906. Additionally, the processor 1904 need not be identical to processor 1906.

Processor 1904 includes an integrated memory controller (IMC) 1920 and point-to-point (P2P) interface 1924 and P2P interface 1928. Similarly, the processor 1906 includes an IMC 1922 as well as P2P interface 1926 and P2P interface 1930. IMC 1920 and IMC 1922 couple the processor 1904 and processor 1906, respectively, to respective memories (e.g., memory 1916 and memory 1918). Memory 1916 and memory 1918 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1916 and the memory 1918 locally attach to the respective processors (i.e., processor 1904 and processor 1906). In other embodiments, the main memory may couple with the processors via a bus and shared memory hub. Processor 1904 includes registers 1912 and processor 1906 includes registers 1914.

Computing architecture 1900 includes chipset 1932 coupled to processor 1904 and processor 1906. Furthermore, chipset 1932 can be coupled to storage device 1950, for example, via an interface (I/F) 1938. The I/F 1938 may be, for example, a Peripheral Component Interconnect-enhanced (PCIe) interface, a Compute Express Link® (CXL) interface, or a Universal Chiplet Interconnect Express (UCIe) interface. Storage device 1950 can store instructions executable by circuitry of computing architecture 1900 (e.g., processor 1904, processor 1906, GPU 1948, accelerator 1954, vision processing unit 1956, or the like). For example, storage device 1950 can store instructions for server device 102, client devices 112, client devices 116, or the like.

Processor 1904 couples to the chipset 1932 via P2P interface 1928 and P2P 1934 while processor 1906 couples to the chipset 1932 via P2P interface 1930 and P2P 1936. Direct media interface (DMI) 1976 and DMI 1978 may couple the P2P interface 1928 and the P2P 1934 and the P2P interface 1930 and P2P 1936, respectively. DMI 1976 and DMI 1978 may be a high-speed interconnect that facilitates, e.g., eight Giga Transfers per second (GT/s) such as DMI 3.0. In other embodiments, the processor 1904 and processor 1906 may interconnect via a bus.

The chipset 1932 may comprise a controller hub such as a platform controller hub (PCH). The chipset 1932 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1932 may comprise more than one controller hub such as a chipset with a memory controller hub, a graphics controller hub, and an input/output (I/O) controller hub.

In the depicted example, chipset 1932 couples with a trusted platform module (TPM) 1944 and UEFI, BIOS, FLASH circuitry 1946 via I/F 1942. The TPM 1944 is a dedicated microcontroller designed to secure hardware by integrating cryptographic keys into devices. The UEFI, BIOS, FLASH circuitry 1946 may provide pre-boot code. The I/F 1942 may also be coupled to a network interface circuit (NIC) 1980 for connections off-chip.

Furthermore, chipset 1932 includes the I/F 1938 to couple chipset 1932 with a high-performance graphics engine, such as, graphics processing circuitry or a graphics processing unit (GPU) 1948. In other embodiments, the computing architecture 1900 may include a flexible display interface (FDI) (not shown) between the processor 1904 and/or the processor 1906 and the chipset 1932. The FDI interconnects a graphics processor core in one or more of processor 1904 and/or processor 1906 with the chipset 1932.

The computing architecture 1900 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1954 and/or vision processing unit 1956 can be coupled to chipset 1932 via I/F 1938. The accelerator 1954 is representative of any type of accelerator device (e.g., a data streaming accelerator, cryptographic accelerator, cryptographic co-processor, an offload engine, etc.). One example of an accelerator 1954 is the Intel® Data Streaming Accelerator (DSA). The accelerator 1954 may be a device including circuitry to accelerate copy operations, data encryption, hash value computation, data comparison operations (including comparison of data in memory 1916 and/or memory 1918), and/or data compression. For example, the accelerator 1954 may be a USB device, PCI device, PCIe device, CXL device, UCIe device, and/or an SPI device. The accelerator 1954 can also include circuitry arranged to execute machine learning (ML) related operations (e.g., training, inference, etc.) for ML models. Generally, the accelerator 1954 may be specially designed to perform computationally intensive operations, such as hash value computations, comparison operations, cryptographic operations, and/or compression operations, in a manner that is more efficient than when performed by the processor 1904 or processor 1906. Because the load of the computing architecture 1900 may include hash value computations, comparison operations, cryptographic operations, and/or compression operations, the accelerator 1954 can greatly increase performance of the computing architecture 1900 for these operations.

The accelerator 1954 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1954. For example, the accelerator 1954 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1954 via a non-posted write (e.g., a deferred memory write (DMWr)). One example of an instruction that atomically submits a work descriptor to the shared work queue of the accelerator 1954 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1954. The dedicated work queue may accept job submissions via commands such as the movdir64b instruction.

Various I/O devices 1960 and display 1952 couple to the bus 1972, along with a bus bridge 1958 which couples the bus 1972 to a second bus 1974 and an I/F 1940 that connects the bus 1972 with the chipset 1932. In one embodiment, the second bus 1974 may be a low pin count (LPC) bus. Various devices may couple to the second bus 1974 including, for example, a keyboard 1962, a mouse 1964 and communication devices 1966.

Furthermore, an audio I/O 1968 may couple to second bus 1974. Many of the I/O devices 1960 and communication devices 1966 may reside on the system-on-chip (SoC) 1902 while the keyboard 1962 and the mouse 1964 may be add-on peripherals. In other embodiments, some or all the I/O devices 1960 and communication devices 1966 are add-on peripherals and do not reside on the system-on-chip (SoC) 1902.

FIG. 20 illustrates a block diagram of an exemplary communications architecture 2000 suitable for implementing various embodiments as previously described. The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in FIG. 20, the communications architecture 2000 includes one or more clients 2002 and servers 2004. The clients 2002 may implement a client version of the server device 102, for example. The servers 2004 may implement a server version of the server device 102, for example. The clients 2002 and the servers 2004 are operatively connected to one or more respective client data stores 2008 and server data stores 2010 that can be employed to store information local to the respective clients 2002 and servers 2004, such as cookies and/or associated contextual information.

The clients 2002 and the servers 2004 may communicate information between each other using a communication framework 2006. The communications communication framework 2006 may implement any well-known communications techniques and protocols. The communications communication framework 2006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 2006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2002 and the servers 2004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a method, includes generating, using at least one processor, a structural representation of an electronic document, the structural representation specifying one or more elements of the electronic document and one or more relationships between the one or more elements of the electronic document; identifying, using the at least one processor, a machine learning model for the electronic document, and applying, based on the structural representation of the electronic document, the machine learning model to one or more portions of the electronic document to generate a hierarchical representation for the one or more portions of the electronic document; receiving, using the at least one processor, a request to execute at least one processing task related to the electronic document; sending, using the at least one processor, at least one generated hierarchical representation of at least one portion in the one or more portions of the electronic document to a generative artificial intelligence (AI) model to execute the at least one processing task by generating a response to the request; and receiving, using the at least one processor, the response and presenting the response on a graphical user interface of at least one user computing device.

The method may also include receiving, using the at least one processor, at least one feedback from the at least one user computing device.

The method may also include performing, using the at least one processor, based on the received at least one feedback, at least one of the following: updating the generated structural representation of the electronic document to generate an updated structural representation of the electronic document; identifying at least another machine learning model for the electronic document and applying the another machine learning model to one or more portions of the electronic document to generate at least another hierarchical representation for the one or more portions of the electronic document; updating the machine learning identified for the electronic document to generate an updated machine learning model applying the updated machine learning model to one or more portions of the electronic document to generate an updated hierarchical representation for the one or more portions of the electronic document; generating an updated hierarchical representation for at least one portion in the one or more portions of the electronic document; and any combination thereof; and receiving, using the at least one processor, in response to the performing, an updated response from the generative AI model and presenting the updated response on the graphical user interface of at least one user computing device.

The method may also include wherein the generating the structural representation of the electronic document includes hierarchically arranging of the one or more elements based on the one or more relationships between one or more elements of the electronic document.

The method may also include wherein the generating the structural representation of the electronic document includes generating one or more groups of the one or more elements within hierarchically arranged one or more elements.

The method may also include wherein at least one of hierarchical arrangement of the one or more elements and the one or more groups of the one or more elements are determined based on at least one of the following: a position of each element in the one or more elements in the electronic document, a type of each element in the one or more elements in the electronic document, one or more functions of each element in the one or more elements in the electronic document, and any combination thereof.

The method may also include wherein the one or more elements include at least one of the following: a text, an audio, a video, an image, a table, and any combination thereof.

The method may also include wherein the at least one processing task includes at least one of the following: a summarization of the electronic document, a summarization of at least one element in the one or more elements, a contextual extraction from the electronic document, an explanation of the electronic document, an explanation of at least one element in the one or more elements, an explanation of at least one portion in the one or more portions, a semantic search of the electronic document, a generation of an outline of the electronic document, and any combinations thereof.

The method may also include wherein the identifying includes generating the hierarchical representation for the one or more portions of the electronic document based on at least one of the following: an importance parameter associated with at least one element in the one or more elements, the at least one processing task, a content of at least one element in the one or more elements, and any combinations thereof.

The method may also include wherein the importance parameter is defined by the at least one processing task.

The method may also include wherein the importance parameter is defined by at least one of the following: a type of the electronic document, a position of each element in the one or more elements in the electronic document, a type of each element in the one or more elements in the electronic document, one or more functions of each element in the one or more elements in the electronic document, and any combination thereof.

In one aspect, a system includes at least one processor; and at least one non-transitory storage media storing instructions, that when executed by the at least one processor, cause the at least one processor to perform operations including identifying a machine learning model for an electronic document, and applying, based on a structural representation of the electronic document, the machine learning model to one or more portions of the electronic document to generate a hierarchical representation for the one or more portions of the electronic document, where the structural representation of the electronic document specifies one or more elements of the electronic document and one or more relationships between the one or more elements of the electronic document; sending, in response to receiving a request to execute at least one processing task related to the electronic document, at least one generated hierarchical representation of at least one portion in the one or more portions of the electronic document to a generative artificial intelligence (AI) model to execute the at least one processing task by generating a response to the request; and presenting the response on a graphical user interface of at least one user computing device.

The system may also include wherein the operations further comprise receiving at least one feedback from the at least one user computing device; performing based on the received at least one feedback, at least one of the following: updating the generated structural representation of the electronic document to generate an update structural representation of the electronic document; identifying at least another machine learning model for the electronic document and applying the another machine learning model to one or more portions of the electronic document to generate at least another hierarchical representation for the one or more portions of the electronic document; updating the machine learning identified for the electronic document to generate an updated machine learning model applying the updated machine learning model to one or more portions of the electronic document to generate an updated hierarchical representation for the one or more portions of the electronic document; generating an updated hierarchical representation for at least one portion in the one or more portions of the electronic document; and any combination thereof; and receiving in response to the performing, an updated response from the generative AI model and presenting the updated response on the graphical user interface of at least one user computing device.

The system may also include wherein the generating the structural representation of the electronic document includes hierarchically arranging of the one or more elements based on the one or more relationships between one or more elements of the electronic document; and generating one or more groups of the one or more elements within hierarchically arranged one or more elements; wherein at least one of hierarchical arrangement of the one or more elements and the one or more groups of the one or more elements are determined based on at least one of the following: a position of each element in the one or more elements in the electronic document, a type of each element in the one or more elements in the electronic document, one or more functions of each element in the one or more elements in the electronic document, and any combination thereof.

The system may also include wherein the at least one processing task includes at least one of the following: a summarization of the electronic document, a summarization of at least one element in the one or more elements, a contextual extraction from the electronic document, an explanation of the electronic document, an explanation of at least one element in the one or more elements, an explanation of at least one portion in the one or more portions, a semantic search of the electronic document, a generation of an outline of the electronic document, and any combinations thereof.

The system may also include wherein the identifying includes generating the hierarchical representation for the one or more portions of the electronic document based on at least one of the following: an importance parameter associated with at least one element in the one or more elements, the at least one processing task, a content of at least one element in the one or more elements, and any combinations thereof.

The system may also include wherein the importance parameter is defined by at least one of the following: the at least one processing task, a type of the electronic document, a position of each element in the one or more elements in the electronic document, a type of each element in the one or more elements in the electronic document, one or more functions of each element in the one or more elements in the electronic document, and any combination thereof.

In one aspect, a computer program product comprising a non-transitory machine-readable medium storing instructions that, when executed by at least one programmable processor, cause the at least one programmable processor to perform operations comprising: receiving a request to execute at least one processing task related to an electronic document; sending a hierarchical representation of at least one portion in one or more portions of the electronic document to a generative artificial intelligence (AI) model to execute the at least one processing task by generating a response to the request, the hierarchical representation being generated by applying a machine learning model to one or more portions of the electronic document, the machine learning model being selected based on a structural representation of the electronic document, the structural representation specifying one or more elements of the electronic document and one or more relationships between the one or more elements of the electronic document; presenting the response on a graphical user interface of at least one user computing device; receiving at least one feedback from the at least one user computing device; and generating, in response to the receiving the at least one feedback, an updated response by the generative AI model and presenting the updated response on the graphical user interface of the at least one user computing device.

The computer program product may also include wherein the operations further comprise performing, based on the received at least one feedback, and sending to the generating AI model at least one of the following: updating the generated structural representation of the electronic document to generate an update structural representation of the electronic document; identifying at least another machine learning model for the electronic document and applying the another machine learning model to one or more portions of the electronic document to generate at least another hierarchical representation for the one or more portions of the electronic document; updating the machine learning identified for the electronic document to generate an updated machine learning model applying the updated machine learning model to one or more portions of the electronic document to generate an updated hierarchical representation for the one or more portions of the electronic document; generating an updated hierarchical representation for at least one portion in the one or more portions of the electronic document; and any combination thereof.

The computer program product may also include wherein the sending includes generating the hierarchical representation for the one or more portions of the electronic document based on at least one of the following: an importance parameter associated with at least one element in the one or more elements, the at least one processing task, a content of at least one element in the one or more elements, and any combinations thereof; wherein the importance parameter is defined by at least one of the following: the at least one processing task, a type of the electronic document, a position of each element in the one or more elements in the electronic document, a type of each element in the one or more elements in the electronic document, one or more functions of each element in the one or more elements in the electronic document, and any combination thereof.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer implemented method, comprising:

generating, using at least one processor, a structural representation of an electronic document, the structural representation specifying one or more elements of the electronic document and one or more relationships between the one or more elements of the electronic document;

selecting, using the at least one processor, based on the structural representation, a machine learning model from a plurality of machine learning models for the electronic document, and applying, based on the structural representation of the electronic document, the selected machine learning model to one or more portions of the electronic document to generate a hierarchical representation for the one or more portions of the electronic document;

receiving, using the at least one processor, a request to execute at least one processing task related to the electronic document;

sending, using the at least one processor, at least one generated hierarchical representation of at least one portion in the one or more portions of the electronic document to a generative artificial intelligence (AI) model to execute the at least one processing task by generating a response to the request; and receiving, using the at least one processor, the response and presenting the response on a graphical user interface of at least one user computing device.

2. The method of claim 1, further comprising receiving, using the at least one processor, at least one feedback from the at least one user computing device.

3. The method of claim 2, further comprising performing, using the at least one processor, based on the received at least one feedback, at least one of the following:

updating the generated structural representation of the electronic document to generate an updated structural representation of the electronic document;

identifying at least another machine learning model for the electronic document and applying the another machine learning model to one or more portions of the electronic document to generate at least another hierarchical representation for the one or more portions of the electronic document;

updating the machine learning model selected for the electronic document to generate an updated machine learning model applying the updated machine learning model to one or more portions of the electronic document to generate an updated hierarchical representation for the one or more portions of the electronic document;

generating an updated hierarchical representation for at least one portion in the one or more portions of the electronic document; and any combination thereof; and receiving, using the at least one processor, in response to the performing, an updated response from the generative AI model and presenting the updated response on the graphical user interface of at least one user computing device.

4. The method of claim 1, wherein the generating the structural representation of the electronic document includes hierarchically arranging of the one or more elements based on the one or more relationships between one or more elements of the electronic document.

5. The method of claim 4, wherein the generating the structural representation of the electronic document includes generating one or more groups of the one or more elements within hierarchically arranged one or more elements.

6. The method of claim 5, wherein at least one of hierarchical arrangement of the one or more elements and the one or more groups of the one or more elements are determined based on at least one of the following: a position of each element in the one or more elements in the electronic document, a type of each element in the one or more elements in the electronic document, one or more functions of each element in the one or more elements in the electronic document, and any combination thereof.

7. The method of claim 1, wherein the one or more elements include at least one of the following: a text, an audio, a video, an image, a table, and any combination thereof.

8. The method of claim 1, wherein the at least one processing task includes at least one of the following: a summarization of the electronic document, a summarization of at least one element in the one or more elements, a contextual extraction from the electronic document, an explanation of the electronic document, an explanation of at least one element in the one or more elements, an explanation of at least one portion in the one or more portions, a semantic search of the electronic document, a generation of an outline of the electronic document, and any combinations thereof.

9. The method of claim 1, wherein the selecting includes generating the hierarchical representation for the one or more portions of the electronic document based on at least one of the following: an importance parameter associated with at least one element in the one or more elements, the at least one processing task, a content of at least one element in the one or more elements, and any combinations thereof.

10. The method of claim 9, wherein the importance parameter is defined by the at least one processing task.

11. The method of claim 10, wherein the importance parameter is defined by at least one of the following: a type of the electronic document, a position of each element in the one or more elements in the electronic document, a type of each element in the one or more elements in the electronic document, one or more functions of each element in the one or more elements in the electronic document, and any combination thereof.

12. A system, comprising:

at least one processor; and at least one non-transitory storage media storing instructions, that when executed by the at least one processor, cause the at least one processor to perform operations including selecting, based on a structural representation of an electronic document, a machine learning model from a plurality of machine learning models for the electronic document, and applying, based on the structural representation of the electronic document, the selected machine learning model to one or more portions of the electronic document to generate a hierarchical representation for the one or more portions of the electronic document, where the structural representation of the electronic document specifies one or more elements of the electronic document and one or more relationships between the one or more elements of the electronic document;

sending, in response to receiving a request to execute at least one processing task related to the electronic document, at least one generated hierarchical representation of at least one portion in the one or more portions of the electronic document to a generative artificial intelligence (AI) model to execute the at least one processing task by generating a response to the request; and presenting the response on a graphical user interface of at least one user computing device.

13. The system of claim 12, wherein the operations further comprise receiving at least one feedback from the at least one user computing device;

performing based on the received at least one feedback, at least one of the following:

updating the structural representation of the electronic document to generate an update structural representation of the electronic document;

identifying at least another machine learning model for the electronic document and applying the another machine learning model to one or more portions of the electronic document to generate at least another hierarchical representation for the one or more portions of the electronic document;

updating the machine learning model selected for the electronic document to generate an updated machine learning model applying the updated machine learning model to one or more portions of the electronic document to generate an updated hierarchical representation for the one or more portions of the electronic document;

generating an updated hierarchical representation for at least one portion in the one or more portions of the electronic document; and any combination thereof; and receiving in response to the performing, an updated response from the generative AI model and presenting the updated response on the graphical user interface of at least one user computing device.

14. The system of claim 12, wherein the generating the structural representation of the electronic document includes hierarchically arranging of the one or more elements based on the one or more relationships between one or more elements of the electronic document; and generating one or more groups of the one or more elements within hierarchically arranged one or more elements;

wherein at least one of hierarchical arrangement of the one or more elements and the one or more groups of the one or more elements are determined based on at least one of the following: a position of each element in the one or more elements in the electronic document, a type of each element in the one or more elements in the electronic document, one or more functions of each element in the one or more elements in the electronic document, and any combination thereof.

15. The system of claim 12, wherein the at least one processing task includes at least one of the following: a summarization of the electronic document, a summarization of at least one element in the one or more elements, a contextual extraction from the electronic document, an explanation of the electronic document, an explanation of at least one element in the one or more elements, an explanation of at least one portion in the one or more portions, a semantic search of the electronic document, a generation of an outline of the electronic document, and any combinations thereof.

16. The system of claim 12, wherein the selecting includes generating the hierarchical representation for the one or more portions of the electronic document based on at least one of the following: an importance parameter associated with at least one element in the one or more elements, the at least one processing task, a content of at least one element in the one or more elements, and any combinations thereof.

17. The system of claim 16, wherein the importance parameter is defined by at least one of the following: the at least one processing task, a type of the electronic document, a position of each element in the one or more elements in the electronic document, a type of each element in the one or more elements in the electronic document, one or more functions of each element in the one or more elements in the electronic document, and any combination thereof.

18. A computer program product comprising a non-transitory machine-readable medium storing instructions that, when executed by at least one programmable processor, cause the at least one programmable processor to perform operations comprising:

receiving a request to execute at least one processing task related to an electronic document;

sending a hierarchical representation of at least one portion in one or more portions of the electronic document to a generative artificial intelligence (AI) model to execute the at least one processing task by generating a response to the request, the hierarchical representation being generated by applying a machine learning model selected from a plurality of machine learning models to one or more portions of the electronic document, the selected machine learning model being selected based on a structural representation of the electronic document, the structural representation specifying one or more elements of the electronic document and one or more relationships between the one or more elements of the electronic document;

presenting the response on a graphical user interface of at least one user computing device;

receiving at least one feedback from the at least one user computing device; and presenting, in response to the receiving the at least one feedback, an updated response generated by the generative AI model on the graphical user interface of the at least one user computing device.

19. The computer program product of claim 18, wherein the operations further comprise performing, based on the received at least one feedback, and sending to the generating AI model at least one of the following:

updating the structural representation of the electronic document to generate an update structural representation of the electronic document;

identifying at least another machine learning model for the electronic document and applying the another machine learning model to one or more portions of the electronic document to generate at least another hierarchical representation for the one or more portions of the electronic document;

updating the machine learning model selected for the electronic document to generate an updated machine learning model applying the updated machine learning model to one or more portions of the electronic document to generate an updated hierarchical representation for the one or more portions of the electronic document;

generating an updated hierarchical representation for at least one portion in the one or more portions of the electronic document; and any combination thereof.

20. The computer program product of claim 19, wherein the sending includes generating the hierarchical representation for the one or more portions of the electronic document based on at least one of the following: an importance parameter associated with at least one element in the one or more elements, the at least one processing task, a content of at least one element in the one or more elements, and any combinations thereof;

wherein the importance parameter is defined by at least one of the following: the at least one processing task, a type of the electronic document, a position of each element in the one or more elements in the electronic document, a type of each element in the one or more elements in the electronic document, one or more functions of each element in the one or more elements in the electronic document, and any combination thereof.

* * * * *